US012662244B1

(12) United States Patent
Storey et al.

(10) Patent No.: US 12,662,244 B1
(45) Date of Patent: Jun. 23, 2026

(54) DOUBLE HINGED TILTING MOUNT FOR COAXIAL CONTRA ROTATING ELECTRIC PROPULSION

(71) Applicant: Lockheed Martin Corporation, Bethesda, MD (US)

(72) Inventors: Terrance James Elliott Storey, San Luis Obispo, CA (US); Dustin Eli Gamble, San Luis Obispo, CA (US); Matthew Curran, San Luis Obispo, CA (US)

(73) Assignee: Lockheed Martin Corporation, Bethesda, MD (US)

( * ) Notice: Subject to any disclaimer, the term of this patent is extended or adjusted under 35 U.S.C. 154(b) by 0 days.

(21) Appl. No.: 18/989,252

(22) Filed: Dec. 20, 2024

(51) Int. Cl.
| | |
|---|---|
| *B64C 29/00* | (2006.01) |
| *B64C 11/48* | (2006.01) |
| *B64U 30/297* | (2023.01) |

(52) U.S. Cl.
CPC .......... *B64C 29/0033* (2013.01); *B64C 11/48* (2013.01); *B64U 30/297* (2023.01)

(58) Field of Classification Search
CPC .... B64C 29/0033; B64C 11/48; B64U 30/297
See application file for complete search history.

(56) References Cited

U.S. PATENT DOCUMENTS

| | | | |
|---|---|---|---|
| 2,021,481 A | 11/1935 | Dornier | |
| 6,655,631 B2 * | 12/2003 | Austen-Brown | .... B64D 27/355 244/12.4 |

| | | | |
|---|---|---|---|
| 9,187,174 B2 * | 11/2015 | Shaw | ...................... B64C 27/28 |
| 9,643,720 B2 * | 5/2017 | Hesselbarth | ........... C12M 23/46 |
| 9,963,228 B2 | 5/2018 | McCullough et al. | |
| 10,011,351 B2 | 7/2018 | McCullough et al. | |
| 10,093,417 B2 | 10/2018 | Meringer et al. | |
| 10,183,746 B2 | 1/2019 | McCullough et al. | |

(Continued)

FOREIGN PATENT DOCUMENTS

| | | |
|---|---|---|
| CN | 111703569 A | 9/2020 |
| CN | 110550202 B | 12/2020 |

(Continued)

OTHER PUBLICATIONS

European Extended Search Report in EP Application No. 252222239. 3-1009 dated Apr. 22, 2026.

*Primary Examiner* — Brian M O'Hara
(74) *Attorney, Agent, or Firm* — Baker Botts L.L.P.

(57) ABSTRACT

An assembly for controlling the orientation of a counterrotating rotor includes a main connecting member having a first and second end. A first connecting member, with a coupling end and an outer end, is rotatably coupled to the first end of the main connecting member via a hinge defining a first rotational axis. Similarly, a second connecting member, with a coupling end and an outer end, is rotatably coupled to the second end of the main connecting member via a hinge defining a second rotational axis parallel to the first. The assembly features a first rotor with blades and a motor mounted on the first outer end, and a second rotor with blades and a motor mounted on the second outer end. An actuator assembly applies torque to the connecting members, enabling rotation about their respective rotational axes, allowing precise control of the rotors' orientation for various applications.

20 Claims, 15 Drawing Sheets

(56) References Cited

U.S. PATENT DOCUMENTS

| | | | |
|---|---|---|---|
| 10,214,285 B2 | 2/2019 | McCullough et al. | |
| 10,220,944 B2 | 3/2019 | McCullough et al. | |
| 10,227,133 B2 | 3/2019 | McCullough et al. | |
| 10,232,950 B2 | 3/2019 | McCullough et al. | |
| 10,315,761 B2 | 6/2019 | McCullough et al. | |
| 10,322,799 B2 | 6/2019 | McCullough et al. | |
| 10,343,773 B1 | 7/2019 | McCullough et al. | |
| 10,457,390 B2 | 10/2019 | McCullough et al. | |
| 10,583,921 B1 | 3/2020 | McCullough et al. | |
| 10,611,477 B1 | 4/2020 | McCullough et al. | |
| 11,027,840 B2 | 6/2021 | Zhang et al. | |
| 11,067,374 B2 | 7/2021 | Hill | |
| 11,292,595 B2 | 4/2022 | Meringer et al. | |
| 11,312,487 B2 | 4/2022 | McCullough et al. | |
| 11,465,739 B2 * | 10/2022 | Hymer | B64C 27/22 |
| 11,603,194 B2 | 3/2023 | McCullough et al. | |
| 2005/0051667 A1 | 3/2005 | Arlton et al. | |
| 2009/0212157 A1 | 8/2009 | Arlton et al. | |
| 2019/0009879 A1 | 1/2019 | Phan et al. | |
| 2019/0055003 A1 | 2/2019 | Luo et al. | |
| 2019/0337615 A1 | 11/2019 | Min et al. | |
| 2020/0070969 A1 | 3/2020 | Campbell | |
| 2020/0180756 A1 | 6/2020 | Kapeter | |
| 2022/0106039 A1 | 4/2022 | Müller | |
| 2022/0126996 A1 | 4/2022 | Long | |
| 2022/0144429 A1 | 5/2022 | Warner, IV et al. | |
| 2022/0219820 A1 | 7/2022 | Meringer et al. | |
| 2022/0411047 A1 | 12/2022 | Mihai | |

FOREIGN PATENT DOCUMENTS

| | | | | |
|---|---|---|---|---|
| GB | 2588478 B | | 2/2022 | |
| KR | 102713075 B1 * | 10/2024 | | G05D 1/654 |
| WO | 2017173502 A1 | | 10/2017 | |
| WO | 2022140925 A1 | | 7/2022 | |

* cited by examiner

210 Receiving a communication signal

212 Determining rotational speeds for at least some rotor blades

214 Activating and controlling a rotation of each rotor blade

216 Determining left and right tilt angles

218 Tilting left coaxial counterrotating rotor assembly by left tilt angle

220 Tilting right coaxial counterrotating rotor assembly by right tilt angle

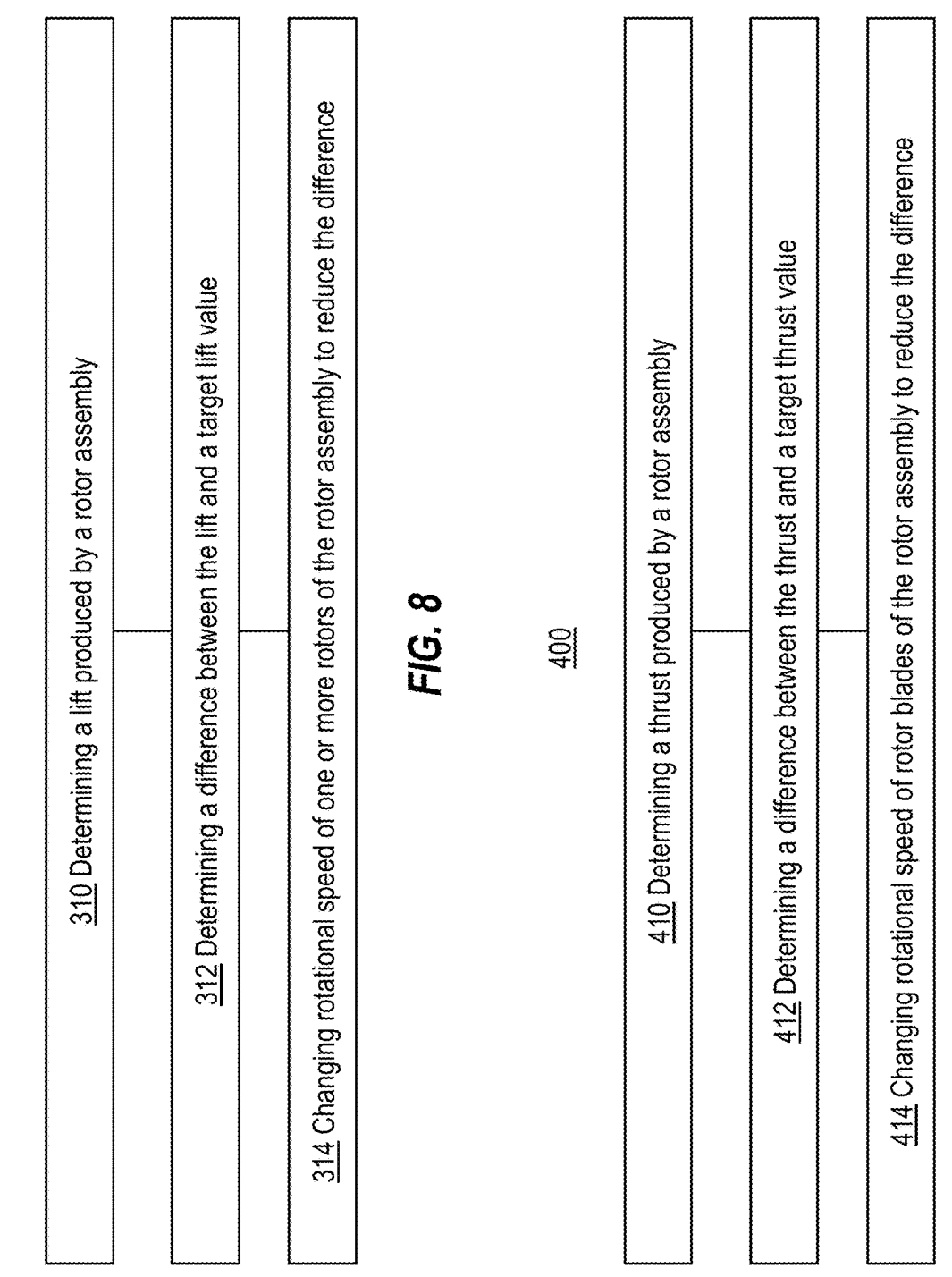

300

310 Determining a lift produced by a rotor assembly

312 Determining a difference between the lift and a target lift value

314 Changing rotational speed of one or more rotors of the rotor assembly to reduce the difference

410 Determining a thrust produced by a rotor assembly

412 Determining a difference between the thrust and a target thrust value

414 Changing rotational speed of rotor blades of the rotor assembly to reduce the difference

Figure 10:
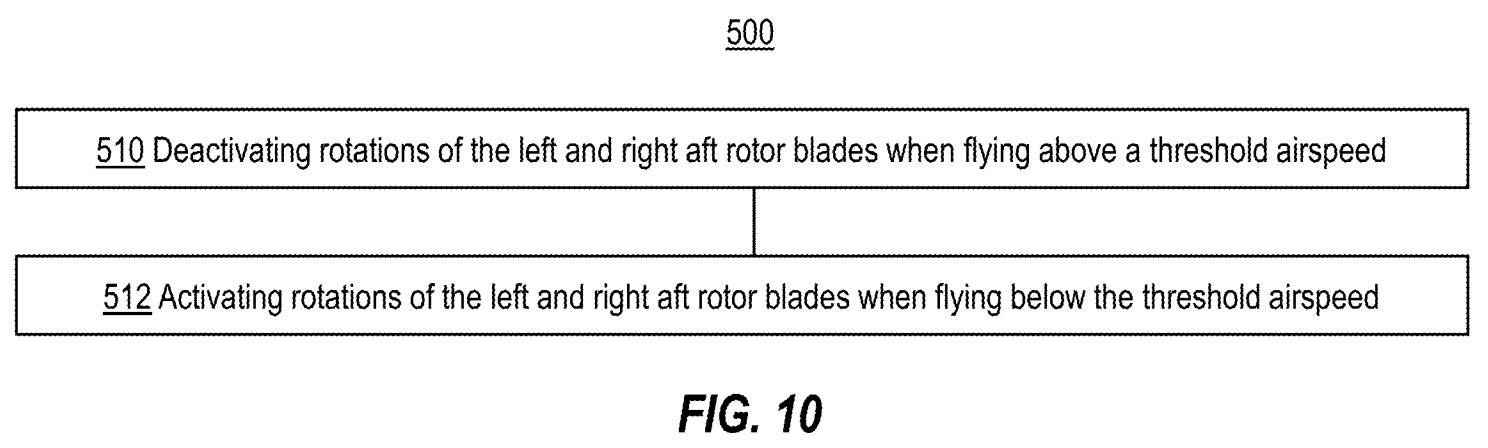

510 Deactivating rotations of the left and right aft rotor blades when flying above a threshold airspeed 512 Activating rotations of the left and right aft rotor blades when flying below the threshold airspeed

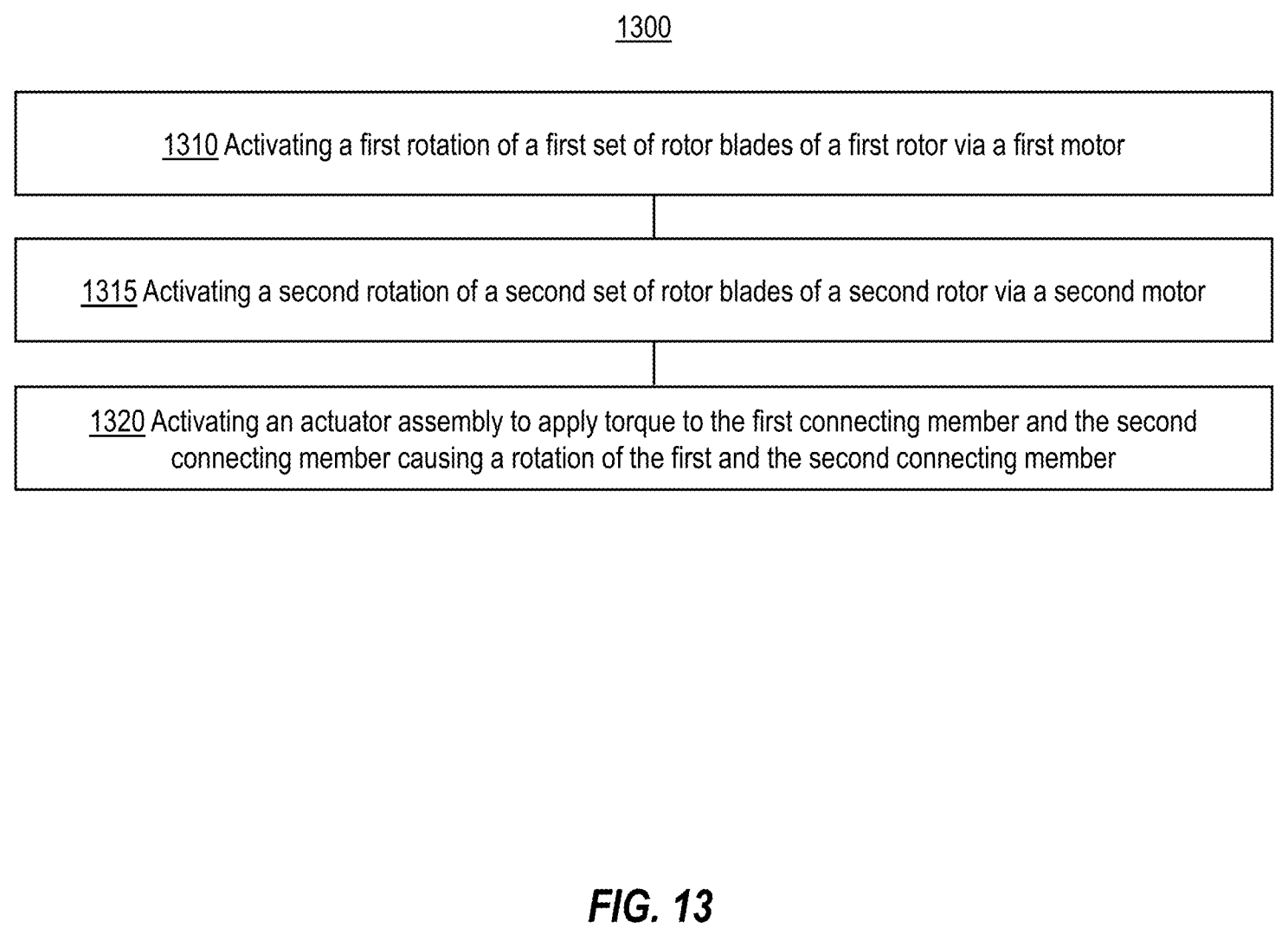

1310 Activating a first rotation of a first set of rotor blades of a first rotor via a first motor 1315 Activating a second rotation of a second set of rotor blades of a second rotor via a second motor 1320 Activating an actuator assembly to apply torque to the first connecting member and the second connecting member causing a rotation of the first and the second connecting member

*FIG. 13*

DOUBLE HINGED TILTING MOUNT FOR COAXIAL CONTRA ROTATING ELECTRIC PROPULSION

TECHNICAL FIELD

This disclosure relates to aerial vehicles and more particularly to the tilt rotor aerial vehicles with redundant hybrid propulsion system.

BACKGROUND

Aerial vehicles equipped with rotating rotor assemblies, such as those used in the V-22 Osprey, combine the vertical lift capabilities of helicopters with the high-speed, long-range flight performance of fixed-wing aircraft. These vehicles, known as tiltrotor aircraft or convertiplanes, can transition between vertical takeoff and landing (VTOL) and horizontal, forward flight. This dual capability makes them exceptionally versatile for a range of missions, from military operations to search and rescue, and commercial transportation.

Rotor assemblies in these aerial vehicles play an important role in providing both lift and thrust. Initially, the rotor blades are positioned vertically to generate lift, enabling the aircraft to take off, hover, and perform vertical maneuvers like a helicopter. Once airborne, the rotor assemblies tilt forward to transition into horizontal flight, where they function similarly to the propellers of a fixed-wing aircraft, providing thrust for forward motion.

One of the challenges for a VTOL aerial vehicle is achieving efficiency during vertical takeoff while simultaneously reducing power consumption during a fixed-wing cruise flight. Current electric VTOL (eVTOL) aerial vehicles typically employ separate motors for vertical takeoff and landing and additional motors for cruising. This configuration results in the vertical motors being inactive during cruise flight, which is not an efficient use of the UAV's power and weight. Moreover, existing VTOL aerial vehicles face critical vulnerabilities due to a single motor failure. If one motor fails, it can result in the complete loss of the vehicle, as the UAV is unable to maintain stable flight.

Therefore, there is a need to improve the efficiency and failsafe mechanisms for eVTOL aircraft, ensuring reliable performance in both vertical and horizontal (fixed-wing) flight.

SUMMARY

Consistent with various other embodiments, the appended claims may serve as a further summary of the disclosure.

According to one example embodiment, an aircraft vehicle is provided. The aircraft vehicle includes an elongated spine element having a first end and a second end, an elongated lift boom disposed at the first end of the spine element, the elongated lift boom extending perpendicular to the elongated spine element, and a left coaxial counterrotating rotor assembly. The left coaxial counterrotating rotor assembly includes a left front rotor blade, a left front motor configured to rotate the left front rotor blade, a left aft rotor blade, a left aft motor configured to rotate the left aft rotor blade in a direction opposite to the direction of rotation of the left front rotor blade, and a left servo motor configured to tilt the left coaxial counterrotating rotor assembly about an axis of the elongated lift boom. Further, the aircraft vehicle includes a right coaxial counterrotating rotor assembly. The right coaxial counterrotating rotor assembly includes a right front rotor blade, a right front motor configured to rotate the right front rotor blade, a right aft rotor blade, a right aft motor configured to rotate the right aft rotor blade in a direction opposite to the direction of rotation of the right front rotor blade, and a right servo motor configured to tilt the right coaxial counterrotating rotor assembly about the axis of the elongated lift boom. Further, the aircraft vehicle includes a tail coaxial counterrotating rotor assembly disposed along the spine element at a location between the first and the second end of the spine element. The coaxial counterrotating rotor assembly includes a top rotor blade, a top motor configured to rotate the top rotor blade, a bottom rotor blade, and a bottom motor configured to rotate the bottom rotor blade in a direction opposite to the direction of rotation of the top rotor blade. Further, the aircraft vehicle includes a power supply for supplying power to the left, right, and tail coaxial counterrotating rotor assemblies, and a controller for controlling the power supplied to the left front, left aft, right front, right aft, and tail coaxial counterrotating rotor assemblies.

According to another example embodiment, a method for actuating rotor assemblies of an aircraft vehicle is provided. The method includes receiving a communication signal determining a flight trajectory for the aircraft vehicle, determining rotational speeds for a left set of rotor blades of a left coaxial counterrotating rotor assembly, and determining rotational speeds for a right set of rotor blades of a right coaxial counterrotating rotor assembly. The method further includes activating the left and right sets of rotor blades by applying power to a plurality of motors configured to rotate the left and right set of rotor blades, and based on a relationship between an airspeed and tilt angles for the left and right coaxial counterrotating rotor assemblies, and based on flight direction, determining the left tilt angle for the left coaxial counterrotating rotor assembly and the right tilt angle for the right coaxial counterrotating rotor assemblies. The method further includes tilting the left coaxial counterrotating rotor assembly by the left tilt angle by applying power to a left servo motor and tilting the right coaxial counterrotating rotor assembly by the right tilt angle by applying power to a right servo motor.

According to another example embodiment, an assembly for controlling the orientation of a counterrotating rotor is provided. The assembly includes a main connecting member having a first end and a second end opposite the first end, a first connecting member having a first coupling end and a first outer end, wherein the first coupling end is rotatably coupled to the first end of the main connecting member via a first hinge, the first hinge defining a first rotational axis, and a second connecting member having a second coupling end and a second outer end, wherein the second coupling end is rotatably coupled to the second end of the main connecting member via a second hinge, the second hinge defining a second rotational axis being parallel to the first rotational axis. Further, the assembly includes a first rotor having first rotor blades, the first rotor coupled to the first outer end, a first motor mounted on the first outer end, configured to rotate the first rotor, a second rotor having second rotor blades, the second rotor coupled to the second outer end, a second motor mounted on the second outer end, configured to rotate the second rotor, and an actuator assembly configured to apply torque to the first and second connecting members, causing rotation of the first connecting member about the first rotational axis and the second connecting member about the second rotational axis.

According to another example embodiment, an aircraft vehicle is provided. The aircraft vehicle includes an elongated spine element having a first end and a second end, an elongated lift boom disposed at the first end of the spine element, the elongated lift boom extending perpendicular to the elongated spine element and a plurality of assemblies of counterrotating rotors, each assembly from the plurality of assemblies coupled to the elongated lift boom. Each assembly from the plurality of assemblies includes a main connecting member having a first end and a second end opposite the first end, a first connecting member having a first coupling end and a first outer end, wherein the first coupling end is rotatably coupled to the first end of the main connecting member via a first hinge, the first hinge defining a first rotational axis, and a second connecting member having a second coupling end and a second outer end, wherein the second coupling end is rotatably coupled to the second end of the main connecting member via a second hinge, the second hinge defining a second rotational axis being parallel to the first rotational axis. Further, each assembly includes a first rotor having first rotor blades, the first rotor coupled to the first outer end, a first motor mounted on the first outer end, configured to rotate the first rotor, a second rotor having second rotor blades, the second rotor coupled to the second outer end, a second motor mounted on the second outer end, configured to rotate the second rotor; and an actuator assembly configured to apply torque to the first and second connecting members, causing rotation of the first connecting member about the first rotational axis and the second connecting member about the second rotational axis.

According to another example embodiment, a method for actuating a rotor assembly is provided. The method includes activating a first rotation of a first set of rotor blades of a first rotor via a first motor, the first rotor and the first motor being coupled to a first outer end of a first connecting member, and activating a second rotation of a second set of rotor blades of a second rotor via a second motor, the second rotor and the second motor being coupled to a second outer end of a second connecting member. Further, the method includes activating an actuator assembly to apply torque to the first and second connecting members. Applying such torque causes a rotation of the first connecting member about a first rotational axis defined by a first hinge. The first hinge is coupled to a main connecting member at the first end of the main connecting member, with the first connecting member connected to the first hinge at its first coupling end. Further, applying such torque causes a rotation of the second connecting member about a second rotational axis defined by a second hinge. The second hinge is coupled to the main connecting member at a second end of the main connecting member, with the second connecting member connected to the second hinge at its second coupling end.

The embodiments disclosed herein are only examples, and the scope of this disclosure is not limited to them. Some embodiments may include all, some, or none of the components, elements, features, functions, operations, or steps of the embodiments disclosed herein. The dependencies or references back in the attached claims are chosen for formal reasons only. However, any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

BRIEF DESCRIPTION OF THE DRAWINGS

FIG. 8 is an example method of adjusting the rotational speed of one or more rotors to maintain the required lift, according to certain embodiments.

FIG. 9 is an example method of adjusting the rotational speed of one or more rotors to maintain the required thrust, according to certain embodiments.

FIG. 10 is an example method of selecting to activate or deactivate aft rotor blades of rotor assemblies, according to certain embodiments.

FIG. 13 is an example method for operating the assembly shown in FIGS. 11A and 11B, according to certain embodiments

DETAILED DESCRIPTION

Aerial Vehicle

Figure 1A:
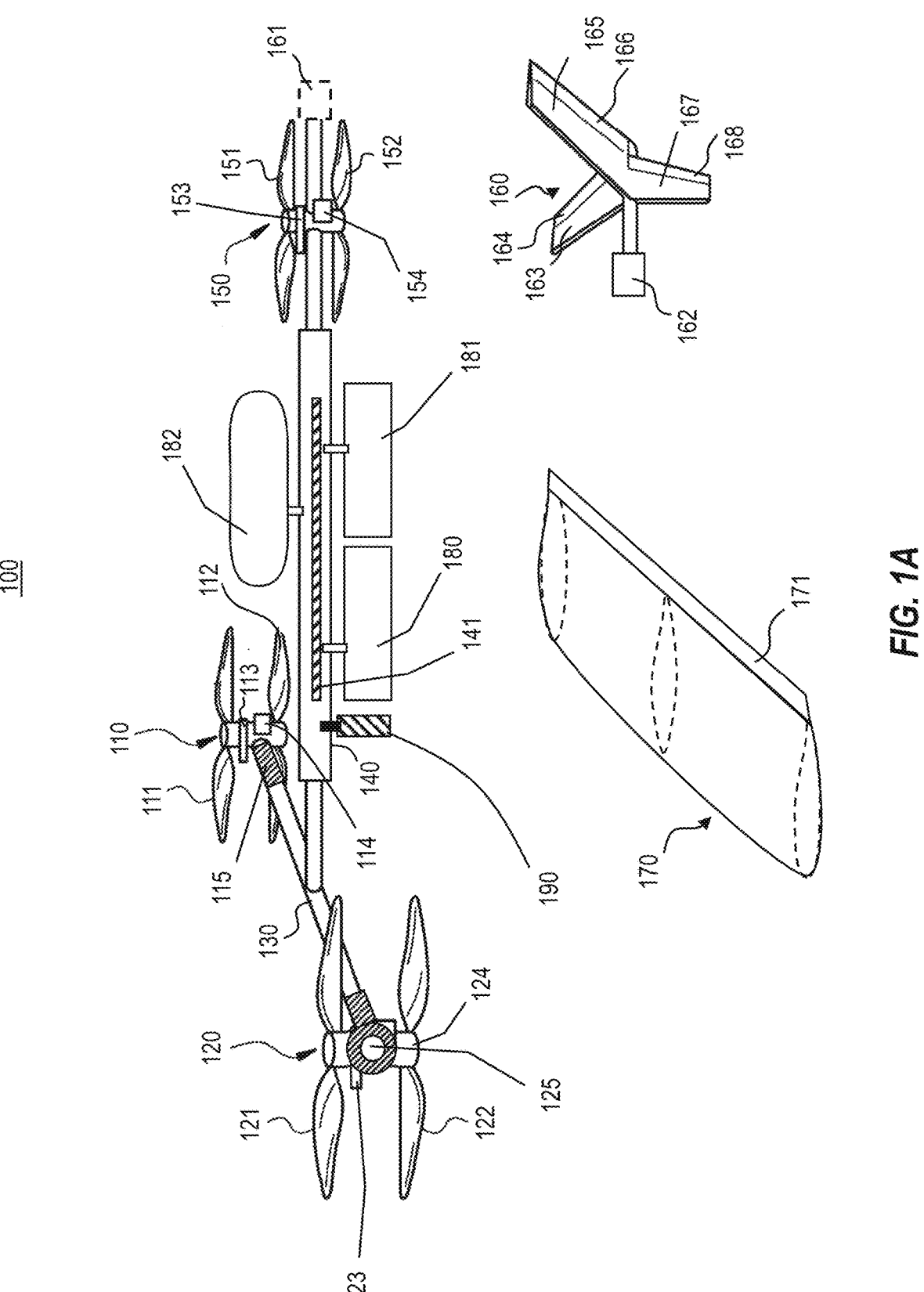
FIG. 1A is an example of an aircraft vehicle, according to certain embodiments.

Various embodiments discussed herein relate to an aircraft vehicle (herein also referred to as an aircraft) capable of vertical and horizontal flight. Such an aircraft vehicle includes rotating or tilting rotor assemblies and is known as tiltrotor aircraft or convertiplane. In various embodiments, the aircraft described herein is configured to take advantage of both helicopter-like vertical takeoff and landing capabilities and the efficient, high-speed flight of fixed-wing aircraft. This dual functionality is achieved through the design of rotor assemblies, which can change orientation to serve different flight modes.

Initially, the rotors of the rotor assemblies are positioned vertically, much like a traditional helicopter's rotors. In this configuration, the rotors generate lift, enabling the aircraft to take off vertically. This allows tiltrotor aircraft to operate in confined spaces without the need for long runways. During this phase, the aircraft can hover, ascend, or descend vertically, and perform precise vertical maneuvers, making it highly versatile for missions such as search and rescue, payload deliveries, and military operations where space is limited, or terrain is challenging.

Once airborne, the aircraft can transition to horizontal flight. This is accomplished by tilting at least some of the rotor assemblies forward. As the rotors tilt, they gradually shift the direction of the thrust from vertical to horizontal. This transition allows the aircraft to accelerate forward and gain speed. When the rotors are fully horizontal, they function similarly to the propellers of a fixed-wing aircraft (when aircraft wings are present), providing thrust for sustained forward motion. In this mode, the wings of the aircraft generate the necessary lift to keep it aloft, which is much more aerodynamically efficient than relying on rotors alone.

One of the capabilities of the tiltrotor aircraft described herein is its ability to hover even when the wings are engaged. This means that at any point during the transition, the pilot can pause the tilting process and maintain a stable hover, combining the benefits of rotary-wing agility with fixed-wing efficiency. This capability is particularly useful during complex operations such as aerial refueling, tactical insertions, or when operating in urban environments where precise positioning is required.

In various embodiments, the landing follows a reverse of the takeoff process. The rotor assemblies tilt back to a vertical position, converting the horizontal thrust back to vertical lift. This allows the aircraft to slow down, descend vertically, and land with precision in areas where conventional aircraft might not be able to operate. The ability to perform vertical landings makes tiltrotor aircraft especially valuable in situations requiring rapid deployment or extraction in rugged or undeveloped areas.

In various embodiments, the tiltrotor aircraft vehicle may be an electric vertical takeoff and landing (eVTOL) unmanned aerial vehicle (UAV) having a communication module that is capable of receiving communication instructions from an external remote controller and flying along a specified flight trajectory. The flight trajectory may include a detailed flight path and the corresponding velocity along that path. These trajectories can be updated dynamically via additional communication instructions. The remote controller typically includes a radio signal transmitter configured to send communication instructions to the eVTOL UAV communication module via radio signals. The eVTOL UAV communication module may include a radio signal receiver for receiving these instructions. Additionally, communication instructions for the eVTOL UAV may be obtained from nearby radio transmitting devices, such as radio towers and satellites.

The eVTOL UAV is equipped with a suitable controller to manage various aspects of its rotor assemblies, including the rotational speed and tilt of the rotors, as well as the control of various aerodynamic surfaces to execute the required flight trajectory. While the flight trajectory can be communicated through external instructions, it can also be autonomously established by the eVTOL UAV based on the specific task it needs to perform. For instance, tasks might include delivering a payload to a specified location while maintaining a certain altitude and avoiding obstacles.

A flight trajectory can be determined by considering several factors related to the task at hand. For example, if the eVTOL UAV is tasked with delivering a package, the trajectory would be planned to optimize the flight path for efficiency, taking into account the shortest route, prevailing weather conditions, and no-fly zones. The UAV may be required to maintain a specified altitude, navigate around obstacles, and adjust its speed to conserve energy and ensure timely delivery.

In some embodiments, machine learning functionality may enhance the capability of eVTOL UAVs in determining optimal flight trajectories. An onboard processor can execute machine learning models to analyze real-time data and predict the best flight path based on current conditions and the task's requirements. These models can process inputs such as power limitations, flight range, payload weight, and environmental factors to dynamically adjust the flight plan. Machine learning algorithms can learn from past missions to improve future performance, enabling the UAV to handle complex tasks more efficiently.

As an illustrative example, if the UAV encounters unexpected obstacles or adverse weather conditions, the machine learning system can recalibrate the trajectory to avoid delays or potential hazards. Furthermore, by analyzing patterns in the UAV's operational data, machine learning models can optimize energy consumption, thus extending the UAV's operational range and effectiveness. This advanced functionality ensures that the eVTOL UAV not only follows the pre-determined instructions but also adapts intelligently to changing circumstances, thereby enhancing mission success rates and operational safety.

An illustrative embodiment of an aircraft vehicle 100 is shown in FIG. 1A. Aircraft vehicle 100 may be any suitable airborne vessel. In some embodiments, aircraft vehicle 100 may be an unmanned aircraft powered by electricity and/or any other suitable power source, as further discussed below. Aircraft vehicle 100 includes an elongated spine element 140 that performs the function of a fuselage and provides structural support to various other parts of aircraft vehicle 100.

Figure 1B:
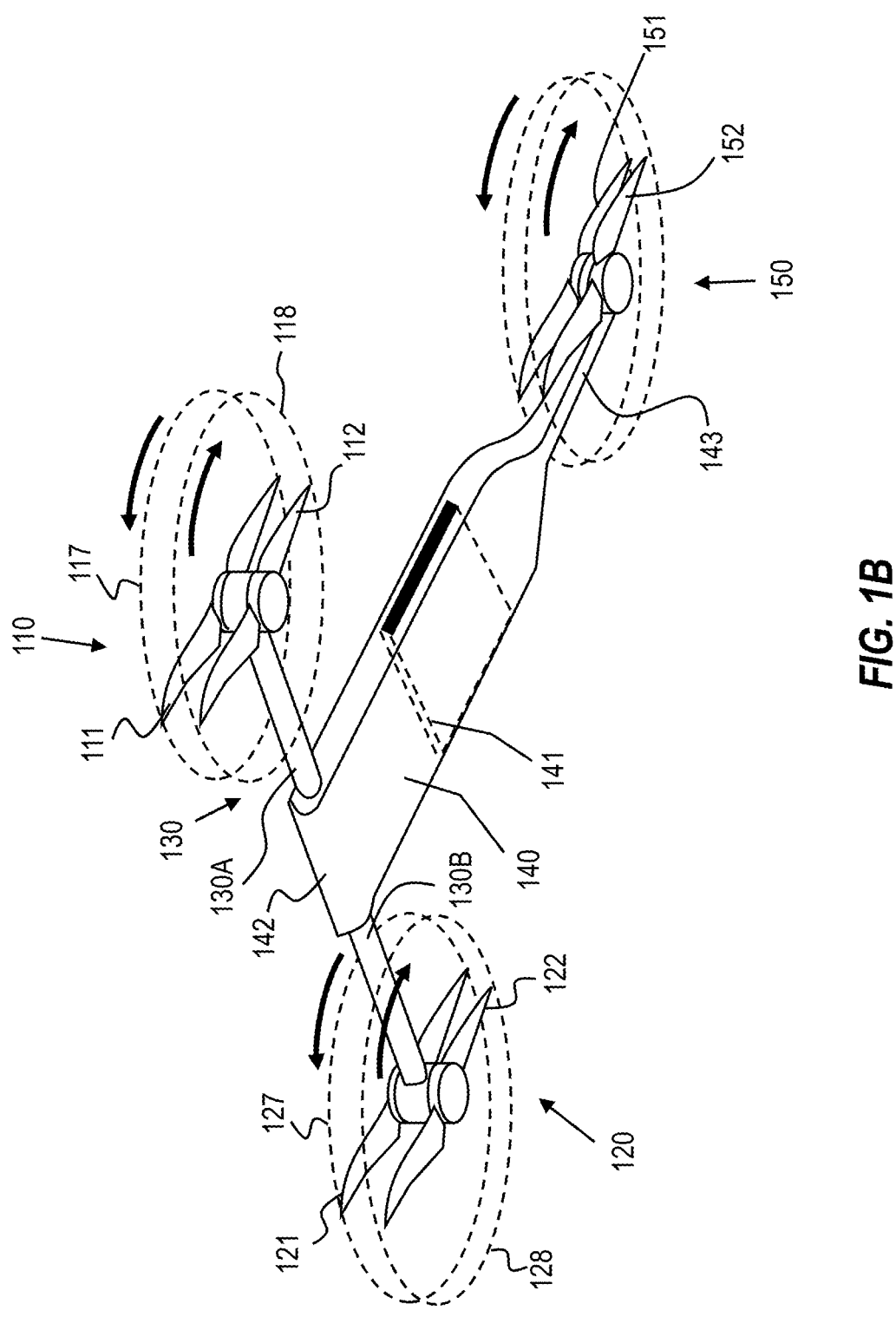
FIG. 1B illustrates an aircraft vehicle operating in hovering mode without wings, according to certain embodiments.

Elongated spine element 140 can be of any suitable shape. For example, in FIG. 1B, it is shown to have a "paddle" shape with a first (front) end 142 and a second (back or tail) end 143. As shown in FIG. 1B, spine element 140 may taper towards second end 143. Further, in some implementations, spine element 140 includes a wing connecting element 141, as shown in FIGS. 1A and 1B, configured to connect removable wings 170, as shown in FIG. 1A. In some cases, wing connecting element 141 may include two slits on both sides of spine element 140 or one slit that runs throughout spine element 140 (as indicated by a dashed line in FIG. 1B, for example) for inserting removable wings 170. The size (width, height, and depth) of the slit can be configured such that removable wings 170 can be inserted on both sides of spine element 140.

FIGS. 1A and 1B show an elongated lift boom 130 coupled to spine element 140 at a first end 142. Elongated lift boom 130 may be of any suitable size, height, shape, and any combinations thereof. Lift boom 130 may be a structural component operable to secure front rotor assemblies to aircraft vehicle 100. As illustrated in FIG. 1, lift boom 130 may extend generally perpendicular to an axis of spine element 140 that extends from first end 142 to second end 143.

FIG. 1B shows that lift boom 130 may include a left side lift boom 130A and a right side lift boom 130B coupled to spine element 140 at first end 142. Left side lift boom 130A and right side lift boom 130B are configured to extend generally perpendicularly to the axis of spine element 140, which connects the first end 142 and second end 143. It should be noted that while lift boom 130 comprises an elongated, generally straight element extending perpendicular to spine element 140, the lift boom may take other possible shapes. For example, left side lift boom 130A and right side lift boom 130B may comprise curved elements and/or elements with generally nonlinear shapes (e.g., triangular elements, and the like).

Lift boom 130 and spine element 140 may be made from any suitable material. When choosing materials for these elements, several factors can be considered, including weight, strength, durability, and ease of manufacturing. Carbon fiber reinforced polymer (CFRP) can be selected for high-performance UAVs due to its high strength-to-weight ratio, excellent stiffness, and good fatigue resistance. Additionally, or alternatively, aluminum alloy offers a good balance of weight, strength, and cost, with alloys like 6061-T6 being commonly used for UAV components. For applications requiring even higher strength, titanium alloy can be a viable option. High-strength thermoplastics can also be selected for lift boom 130 and spine element 140, particularly in smaller UAVs or parts of larger UAVs where reducing weight is more critical than maximizing strength.

As shown in FIGS. 1A and 1B, lift boom 130 includes a left coaxial counterrotating rotor assembly 120 and a right coaxial counterrotating rotor assembly 110. Left coaxial counterrotating rotor assembly 120 is coupled to a left side of lift boom 130, and right coaxial counterrotating rotor assembly 110 is coupled to a right side of lift boom 130. Left coaxial counterrotating rotor assembly 120 includes left front rotor having left front rotor blades 121, a left front motor 123 configured to rotate left front rotor blades 121, left aft rotor having left aft rotor blades 122 and a left aft motor 124 configured to rotate left aft rotor blades 122 in a direction opposite to the direction of rotation of left front rotor blades 121. Further, left coaxial counterrotating rotor assembly 120 includes a left servo motor 125 configured to tilt left coaxial counterrotating rotor assembly 120 about an axis of elongated lift boom 130.

Right coaxial counterrotating rotor assembly 110 includes right front rotor having right front rotor blades 111 and a right front motor 113 configured to rotate right front rotor blades 111. Right coaxial counterrotating rotor assembly 110 further includes a right aft rotor having right aft rotor blades 112, and a right aft motor 114 configured to rotate right aft rotor blades 112 in a direction opposite to the direction of rotation of right front rotor blades 111. Further, right coaxial counterrotating rotor assembly 110 includes a right servo motor 115 configured to tilt right coaxial counterrotating rotor assembly 110 about the axis of elongated lift boom 130.

Coaxial counterrotating motor assemblies 120 and 110 are important components of aircraft vehicle 100, providing the main lift and thrust for vehicle 100. The inclusion of counter-rotating rotors in these assemblies helps balance the aerodynamic forces and counteract the torque that could otherwise destabilize aircraft vehicle 100. By spinning in opposite directions, the rotor blades of these assemblies generate opposing torques that cancel each other out, thereby stabilizing aircraft 100.

The counter-rotating design significantly enhances the stability and control of aircraft vehicle 100, especially during hovering and low-speed maneuvers. It also reduces vibrations, leading to smoother flight and less wear and tear on the aircraft's components. Furthermore, counter-rotating rotors can improve aerodynamic efficiency by reducing the induced drag that occurs due to rotor wash.

Once aircraft vehicle 100 is airborne, rotor assemblies 120 and 110, along with their corresponding rotors, can tilt forward to transition the aircraft into horizontal flight. This tilting capability allows aircraft vehicle 100 to combine the benefits of both a helicopter and an airplane, providing versatility in operations by enabling vertical takeoff, landing, and efficient high-speed forward flight.

In various embodiments, aircraft vehicle 100 may also be equipped with a controller that manages rotor speeds and tilt angles, using real-time data from sensors to make adjustments and ensure stable and efficient flight. Redundant systems and fail-safes are incorporated to enhance the reliability of the rotor assemblies, ensuring that aircraft vehicle 100 can safely handle motor failures and other unexpected conditions as further described below.

It should be noted that, in the example embodiments shown in FIGS. 1A and 1B, each rotor with a set of rotor blades is operated by a corresponding motor (e.g., left front rotor blades 121 are operated by left front motor 123). However, in other embodiments, one motor may be configured to operate more than one set of rotor blades. For example, a single motor may be configured to operate both left front rotor blades 121 and right front rotor blades 111, or both left front rotor blades 121 and aft left rotor blades 122. In general, a single motor may be configured to operate any number and type of rotor blades on vehicle 100. In some cases, when a single motor operates more than one set of rotor blades, a transmission system may be used to convert the motor's rotation to the rotation of the different rotor blades.

In various embodiments, spine element 140 further includes a tail coaxial counterrotating rotor assembly 150 near second end 143 of spine element 140, as shown in FIG. 1A, at a location between first 142 and second end 143 of spine element 140. Tail coaxial counterrotating rotor assembly 150 includes a top rotor having top rotor blades 151, and bottom rotor blades 152, a top motor 153 configured to rotate top rotor blades 151, and a bottom motor 154 configured to rotate bottom rotor blades 152 in a direction opposite to the direction of rotation of top rotor blades 151.

At second end 143, spine element 140 optionally includes a first tail receiving connector 161 (herein, also referred to as a tail connecting element 161) for connecting a tail 160, when aircraft vehicle 100 is configured to operate in airplane mode. In the airplane mode, wings 170 and tail 160 are configured to be attached to aircraft vehicle 100. Tail 160 may be attached to first tail receiving connector 161 via a suitable second tail connector 162.

First tail receiving connector 161 may be any suitable mechanical connector designed for coupling mechanical elements, such as a socket connector. Second tail connector 162 is complementary to first tail receiving connector 161, ensuring a robust connection between the mechanical elements. For instance, second tail connector 162 may be an insertion connector. In other cases, first tail receiving connector 161 and second tail connector 162 may include mechanical coupling elements such as threaded connectors (e.g., bolts or screws), snap-on connectors, or other mechanical connectors.

In an illustrative embodiment, as shown in FIGS. 1A and 1B, tail 160 may have a V-tail configuration. Such a configuration features diagonal stabilizers such as 163, 165, and 167 angled from the main body, forming a shape similar to a V or Y. The V-tail combines the functions of both a traditional horizontal stabilizer and a vertical stabilizer into a single structure. This configuration typically includes control surfaces 164, 166, and 168 known as ruddervators, which combine the actions of rudders and elevators, allowing the surfaces to move together to pitch the aircraft up or down and differentially to provide yaw control.

In various embodiments, aircraft vehicle 100 may be configured with connecting element 141 for attaching removable wings 170. In some cases, when connecting element 141 includes a slit (or a pair of slits, with each slit accommodating one of respective wings 170), removable wings 170 are designed to be inserted into the slit (or slits) of connecting element 141. As shown in FIG. 1A, wings 170 may include ailerons 171 for controlling aircraft vehicle 100 roll and, consequently, its lateral stability and maneuverability. Ailerons 171 are moved via suitable motors such as servo motors that can be integrated into wings 170 and that can be operated by a controller of aircraft vehicle 100.

It should be noted that the V-tail configuration is only one illustrative example, and various other tail designs may be used depending on the required configuration of aircraft vehicle 100. The aircraft vehicle is designed to be modular, allowing for different configurations based on the specific mission requirements. For example, for operations requiring long and relatively slow flight, high aspect ratio wings may be selected to provide a large glide ratio. Conversely, for missions where speed is essential, lower aspect ratio wings, such as delta wings, may be chosen.

Similarly, the duration of the mission, different payload configurations, and power supply options can be adapted to suit the needs of aircraft vehicle 100. For instance, a suitable power supply for the left, right, and tail coaxial counter-rotating rotor assemblies is shown in FIG. 1A as power supply 180. Power supply 180 may be configured to provide electrical power and may include components such as an electrical fuel cell or a battery. Alternatively, other power sources, such as an internal combustion engine or a turbine, may be used to power the aircraft. In some cases, an internal combustion engine or turbine may directly power the rotors using suitable linkage elements. In other cases, these engines can generate electrical power to drive electric motors such as motors 123, 124, 125, 113, 114, 115, as well as 153 and 154 of aircraft vehicle 100.

A fuel tank 182 can be used to supply fuel to the various power components of the aircraft. Fuel tank 182 may carry conventional fuels (e.g., kerosene, gasoline, ethanol) or provide hydrogen for a fuel cell or a hydrogen internal combustion engine. When used for storing hydrogen, fuel tank 182 may store it as a compressed gas. Alternatively, hydrogen can be stored as part of a metal hydride in some implementations. This flexibility in power supply and fuel options further enhances the modularity and adaptability of aircraft vehicle 100 to meet diverse mission requirements.

FIG. 1A further shows a payload 181 coupled to spine element 140. Payload 181 may be any suitable payload configured to be delivered or flown by aircraft vehicle 100. For example, payload 181 may include medical supplies, food supplies, or any other suitable payload. Payload 181 may be coupled to spine element 140 via a payload connecting element.

Additionally, as shown in FIG. 1A, aircraft vehicle 100 includes a controller 190 for controlling the speed and position of left coaxial counterrotating rotor assembly 120, right coaxial counterrotating rotor assembly 110, and tail coaxial counterrotating rotor assembly 150, as further described below.

When removable wings 170 and removable tail 160 are present, controller 190 may be configured to detect the presence of wings 170 and tail 160 and configured to allow for a horizontal ninety-degree orientation for left, and right coaxial counterrotating rotor assemblies 120 and 110, thereby causing aircraft vehicle 100 to fly in an airplane mode (i.e., horizontal orientation). When wings 170 and/or tail 160 are not present, controller 190 may configure aircraft vehicle 100 to operate in helicopter mode. This mode may involve tilting at least some of the right coaxial counterrotating rotor assemblies 120 and 110 to ensure sufficient lift for aircraft vehicle 100.

FIG. 1B shows an example of the hovering configuration of aircraft vehicle 100, in which all rotor assemblies, including left coaxial counter-rotating rotor assembly 120, right coaxial counter-rotating rotor assembly 110, and tail coaxial counter-rotating rotor assembly 150, are engaged. As depicted, rotor blades 121 and 111 are configured to rotate in a clockwise direction, as indicated by the arrows next to circles 127 and 117, respectively, while rotor blades 122 and 112 are configured to rotate in a counterclockwise direction, as indicated by the arrows next to circles 128 and 118, respectively. Similarly, rotor blades 151 are configured to rotate clockwise, and rotor blades 152 are configured to rotate counterclockwise. As shown in FIG. 1B, rotor assemblies 110, 120, and 150 are oriented such that rotor blades 111, 121, and 151 are pointing upwards, while rotor blades 112, 122, and 152 are pointing downwards.

Figure 1C:
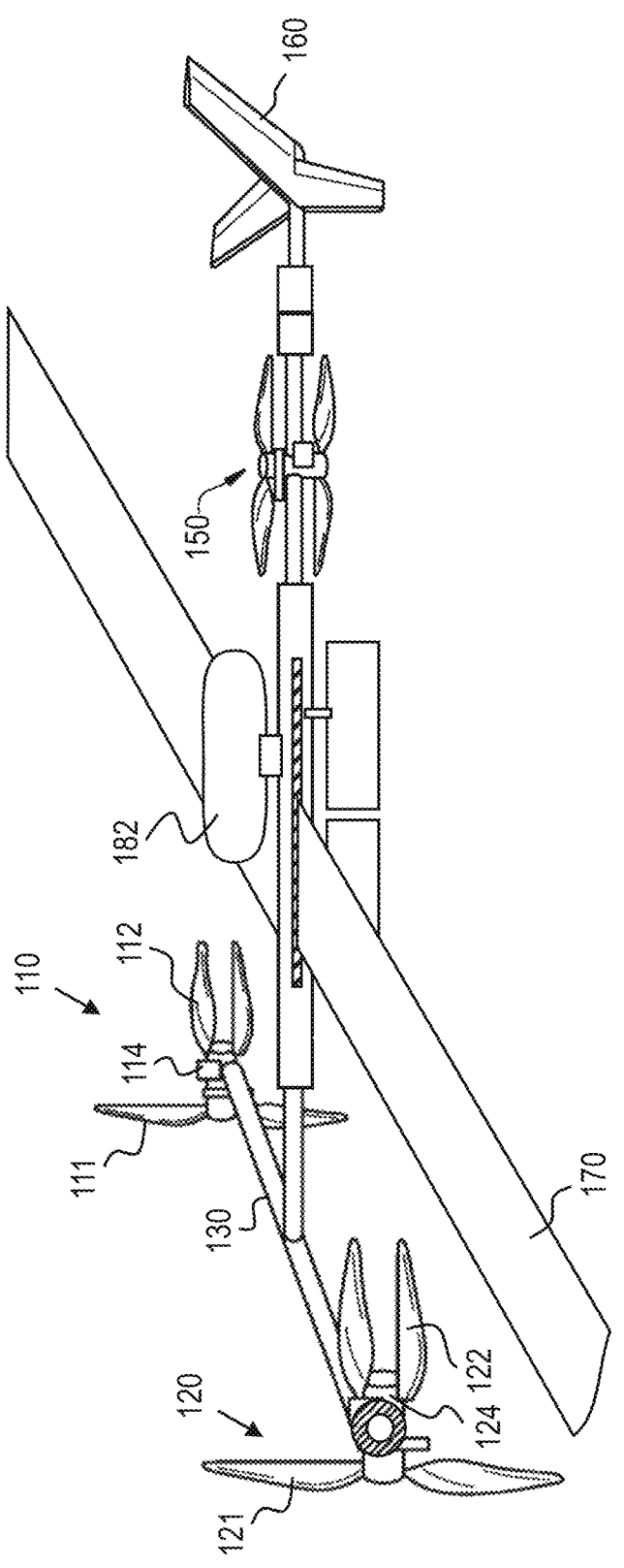
FIG. 1C depicts another aircraft vehicle operating in airplane mode with wings, according to certain embodiments.

FIG. 1C shows an example of the airplane flight configuration of aircraft vehicle 100, in which left coaxial counter-rotating rotor assembly 120 and right coaxial counter-rotating rotor assembly 110 are at least partially engaged, while the tail coaxial counter-rotating rotor assembly 150 is generally not engaged. In this flight configuration, aircraft vehicle 100 includes wings 170 that produce lift, while the V-tail 160 is used for controlling the pitch and yaw of the aircraft. Additionally, left coaxial counter-rotating rotor assembly 120 and right coaxial counter-rotating rotor assembly 110 provide thrust to aircraft vehicle 100. As depicted, rotor blades 121 and 111 are configured to rotate, for example, in a clockwise direction, while rotor blades 122 and 112 are disengaged and folded inwards as shown. In various embodiments, rotor blades 122 and 112 are designed to fold automatically during horizontal flight due to air resistance and their hinged connection to corresponding motors 124 and 114.

In the airplane flight configuration, rotor blades 151 and 152 are configured to move to a position where they extend in the direction of spine element 140, minimizing drag forces on the moving aircraft vehicle 100. Rotor blades 151 and 152 are configured to be not rotating. In some cases, these rotor blades may be configured to be fixed in place.

Figures 2A, 2B, 2C:
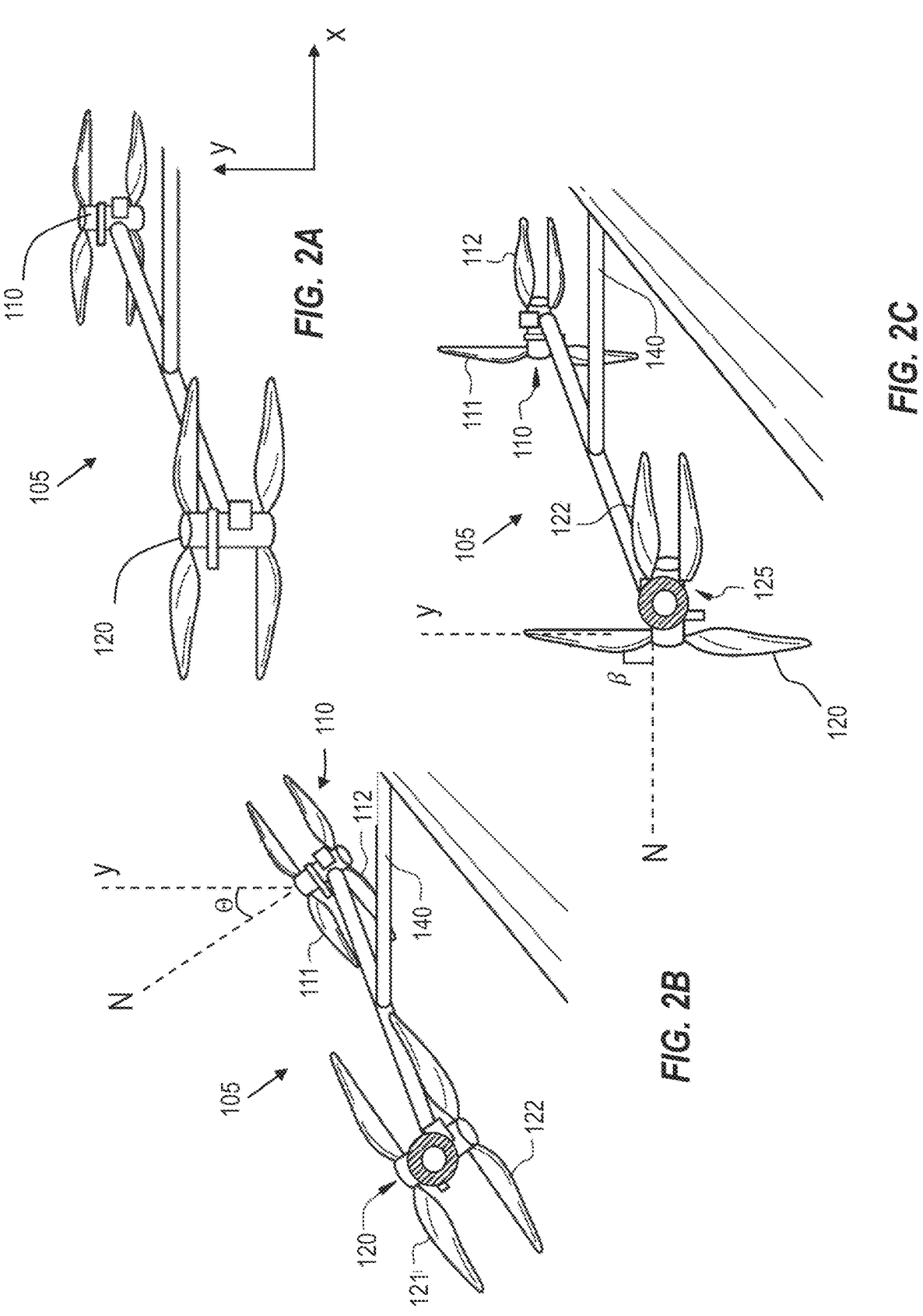
FIGS. 2A-2C illustrate examples of operating rotor assemblies of the aircraft vehicles, according to certain embodiments.

FIGS. 2A-2C illustrate examples of operating left and right coaxial counterrotating rotor assemblies 120 and 110 (herein, for brevity, referred to as rotor assemblies 105, as shown in FIGS. 2A-2C) of aircraft vehicle 100. FIG. 2A illustrates aircraft vehicle 100 operating with rotor assemblies 105 placed in an initial position. Herein, the initial position of the rotor assemblies 105 may be wherein one or more rotor blades 111, 112, 121 and 122 of the rotor assemblies 105 extend horizontally and parallel to a ground surface (such as along an x-axis, as shown in FIG. 2A), such that the left and right front rotors as well as the left and right aft rotors are pointing vertically. In an illustrative embodiment, left front rotor blades 121 of left coaxial counterrotating rotor assembly 120 (herein, for brevity, also referred to as left rotor assembly 120) are configured to face in an opposite direction from left aft rotor blades 122, such that, when rotating in an opposite direction, both left front rotor blades 121 and left aft rotor blades 122 produce a lift force for aircraft vehicle 100. Similarly, right front rotor blades 111 of right coaxial counterrotating rotor assembly 110

(herein, for brevity, also referred to as right rotor assembly 110) are configured to face in an opposite direction from right aft rotor blades 112, such that, when rotating in an opposite direction, both right front rotor blades 111 and right aft rotor blades 112 produce a lift force for aircraft vehicle 100.

FIG. 2B illustrates an example wherein rotor assembly 110 has been actuated to rotate to an angle θ formed between a normal N and the vertical axis (i.e., the y-axis). For example, once vehicle 100 has reached a certain height, controller 190 (as shown in FIG. 1A) may transmit instructions to rotate rotor assemblies 105 by angle θ. This may occur after aircraft vehicle 100 is at a height greater than or equal to an altitude threshold. For example, rotor assemblies 105 may provide lift to aircraft vehicle 100 to reach an altitude of a suitable height. If the altitude is greater than or equal to a threshold value, aircraft vehicle 100 may operate to transition from applying solely lift to a combination of lift and thrust. This may occur by actuating the rotor assemblies 105 to rotate by a prescribed angle with respect to the y-axis around an axis extending along lift boom 130.

FIG. 2C illustrates an example in which rotor assemblies 105 have been actuated to rotate to a final angle β with respect to the vertical axis (i.e., the y-axis), which can be about 90 degrees for a horizontal flight. In some embodiments, rotor assemblies 105 may provide thrust to aircraft vehicle 100 when transitioned to a selected angle with respect to the vertical axis. Controller 190 may be configured to iteratively instruct rotor assemblies 105 to rotate to one or more subsequent angles as the airspeed of vehicle 100 increases. For example, there may be a sensor (not shown) disposed at any suitable location of aircraft vehicle 100 (e.g., at a first end 142 of aircraft vehicle 100) and configured to measure the airspeed of aircraft vehicle 100. Controller 190 may receive one or more measurements associated with the airspeed of aircraft vehicle 100 from the sensor. Controller 190 then may determine whether the airspeed of aircraft vehicle 100 is greater than or equal to a certain value and dynamically adjust the angle of rotor assemblies 105 to increase thrust until a certain airspeed for aircraft vehicle 100 occurs. Once aircraft vehicle 100 achieves a certain airspeed, such as an airspeed threshold value, controller 190 may instruct rotor assemblies 105 to rotate to another angle, or to a final angle β, wherein the final angle may be about 90°. Further, controller 190 may transmit an instruction to stop actuating the left aft rotor blades 122 and right aft rotor blades 112 once rotor assemblies 105 are tilted at final angle β. Without limitations, the aforementioned instruction may include actuating the left aft rotor blades 122 and right aft rotor blades 112 to fold inwards, as shown in FIG. 2C, thereby reducing the potential drag caused by these rotor blades.

Figures 3A, 3B, 3C:
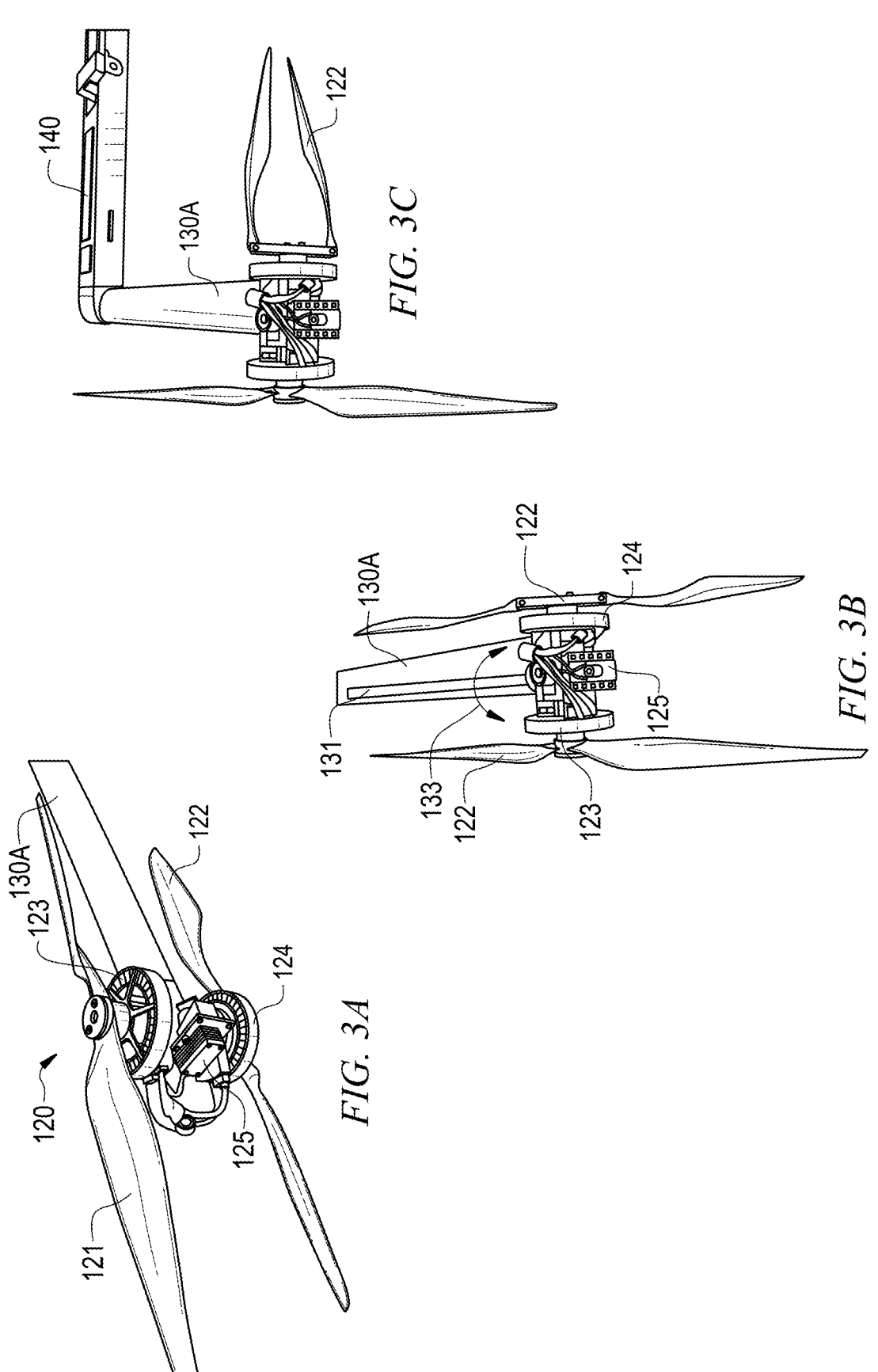
FIGS. 3A-3C show details of rotor assemblies, according to certain embodiments.

FIGS. 3A-3C illustrate further views of left coaxial counterrotating rotor assembly 120 coupled to a left side lift boom 130A. FIG. 3A shows that left coaxial counterrotating rotor assembly 120 includes left front rotor blades 121 having a first pitch and a first shape, left aft rotor blades 122 having a second pitch and a second shape, as well as front motor 123 for rotating left front rotor blades 121, and aft motor 124 for rotating left aft rotor blades 122. Furthermore, the left front rotor blades 121 and left aft rotor blades 122 are configured to be tilted i.e., rotated about axis 131 (as shown in FIG. 3B) as indicated by arrow 133 shown in FIG. 3B. The tilting of these rotor blades is facilitated by servo motor 125, configured to receive a signal from controller 190 (as shown in FIG. 1A) to tilt left front and aft rotor blades 121 and 122 by a prescribed angle, by rotating left coaxial counterrotating rotor assembly 120 around axis 131.

In various embodiments, the tilt angle (such as angle θ, as shown in FIG. 2B) can range from approximately 0 degrees to 90 degrees. A 0-degree tilt corresponds to the configuration shown in FIGS. 2A and 3A, where the left coaxial counter-rotating rotor assembly 120 is pointing upward. Conversely, a 90-degree tilt corresponds to the configuration shown in FIGS. 2C and 3C, where the left coaxial counter-rotating rotor assembly 120 is placed in a horizontal orientation.

In some cases, the tilt angle θ can take on negative values, indicating that left rotor assembly 120 can be angled slightly backwards. This backward tilt can generate negative thrust, causing the aircraft vehicle to move in reverse. The tilt angle θ may range between-20 degrees and 0 degrees, including all values in between. Similarly, right rotor assembly 110 can be configured to tilt slightly backwards, with similar or identical ranges for the tilt angle.

In some cases, the tilt angle for left rotor assembly 120 may be different from the tilt angle for right rotor assembly 110 during the flight of aircraft vehicle 100, thereby causing a rolling or yawing motion for aircraft vehicle 100, depending on the specific angles and thrust produced by each rotor assembly 120 and 110. For example, left servo motor 125 may be configured to tilt left coaxial counterrotating rotor assembly 120 by a first angle, and right servo motor 115 may be configured to tilt right coaxial counterrotating rotor assembly 110 by a second angle, which may be different from the first angle. In an illustrative embodiment, both the first and the second angle can range from a vertical zero orientation to a horizontal ninety-degree orientation, and in some cases can have negative values. When left, right, and tail coaxial counterrotating rotor assemblies 120, 110, and 150 are in a vertical orientation, aircraft vehicle 100 is configured to fly in hovering mode.

If the differential tilt angles cause a difference in vertical lift between the left and right rotor assemblies 120 and 110, aircraft vehicle 100 may roll towards the side with the lesser lift. For instance, if left rotor assembly 120 is tilted further downward than right rotor assembly 110, the right side of aircraft vehicle 100 will generate more lift, causing aircraft vehicle 100 to roll to the left. Conversely, if the differential tilt angles result in differing horizontal thrust vectors, the aircraft will yaw. For example, if left rotor assembly 120 is tilted forward more than right rotor assembly 110, the left side will generate more forward thrust, causing the aircraft to yaw to the right. Similarly, if the left rotor assembly is tilted backward while the right is tilted forward, the aircraft may experience a combination of rolling and yawing, as one side pushes forward and the other pushes backward. Differential tilt angles can be used deliberately to perform complex maneuvers, allowing for coordinated turns, rolls, or hovering with a specific orientation. Note that unintended differences in tilt angles can lead to instability, making it crucial for the flight control system to continuously monitor and adjust the tilt angles for left and right rotor assemblies 120 and 110 to maintain stable flight.

In various embodiments, as shown in FIG. 3A, for example, front and aft rotor blades 121 and 122 need to be oriented and configured in a specific way to optimize performance and stability. First, as previously explained, front rotor blades 121 and aft rotor blades 122 are configured to rotate in opposite directions. For example, if the top rotor rotates clockwise, the bottom rotor should rotate counterclockwise. This counter-rotation helps balance the torques generated by each rotor, thereby stabilizing the aircraft.

Another important aspect is blade alignment. Front and aft rotor blades 121 and 122 should be aligned to avoid interference with each other. In a coaxial counterrotating rotor assembly, such as left coaxial counterrotating rotor assembly 120, alignment refers to the phase shift between front rotor blades 121 and aft rotor blades 122. This phase shift can help reduce interference between rotor blades 121 and 122. By positioning the blades with an angular offset, they can pass through the same vertical plane at different times, thereby reducing aerodynamic interference. In some cases, alignment may not be achieved when front rotor blades 121 rotate at a different rotational speed than aft rotor blades 122.

In various embodiments, the pitch of front rotor blades 121 is reversed compared to aft rotor blades 122, as shown for example in FIG. 3A. This reversal is necessary to ensure that both sets of blades generate lift in the same direction despite their opposite rotation directions. For example, top rotor blades 121, as shown in FIG. 3A have a positive pitch angle (e.g., the leading edge is higher than the trailing edge) and aft rotor blades 122 have a negative pitch angle (e.g., these blades are inclined in an opposite direction to the vertical axis compared to front rotor blades 121) to produce lift in the same upward direction.

Furthermore, the vertical spacing between the top and bottom rotor blades 121 and 122 is carefully selected to limit aerodynamic interference. This spacing ensures that each rotor operates in relatively undisturbed air, thereby improving efficiency and reducing vibration. Additionally, the blades should be designed to maximize aerodynamic efficiency and minimize noise by considering factors such as blade length, width, airfoil shape, and materials.

In some cases, left and right front rotor blades 121 and 111 are optimized for horizontal flight, while left and right aft rotor blades 122 and 112 are optimized for vertical flight. In this configuration, left and right front rotor blades 121 and 111 may have a higher pitch to optimize horizontal cruising, while the left and right aft rotor blades 122 and 112 may have a lower pitch to optimize vertical flight. Furthermore, top and bottom rotor blades 151 and 152, as shown in FIG. 1B, may have an even lower pitch than left and right aft rotor blades 122 and 112. In one illustrative embodiment, the left and right front rotor blades 121 and 111 may have an identical first pitch, while the left and right aft rotor blades 122 and 112 may have an identical second pitch that is lower than the first pitch. Further, in an illustrative embodiment, top and bottom rotor blades 151 and 152 of tail coaxial counterrotating rotor assembly 150 may have an identical third pitch that is lower than the second pitch.

In one illustrative, non-limiting embodiment, the pitch/diameter ratio for left and right front rotor blades 121 and 111 can be approximately 1. The pitch/diameter ratio for left and right aft rotor blades 122 and 112 can be about 0.5, and for top and bottom rotor blades 151 and 152, it can be about 0.4. In this context, the pitch is measured in units of length and is defined as the axial distance a rotor blade would move in one complete revolution, similar to the motion of a screw. The diameter of the rotor blades is measured as the distance between the tips of two opposing rotor blades.

Figure 4:
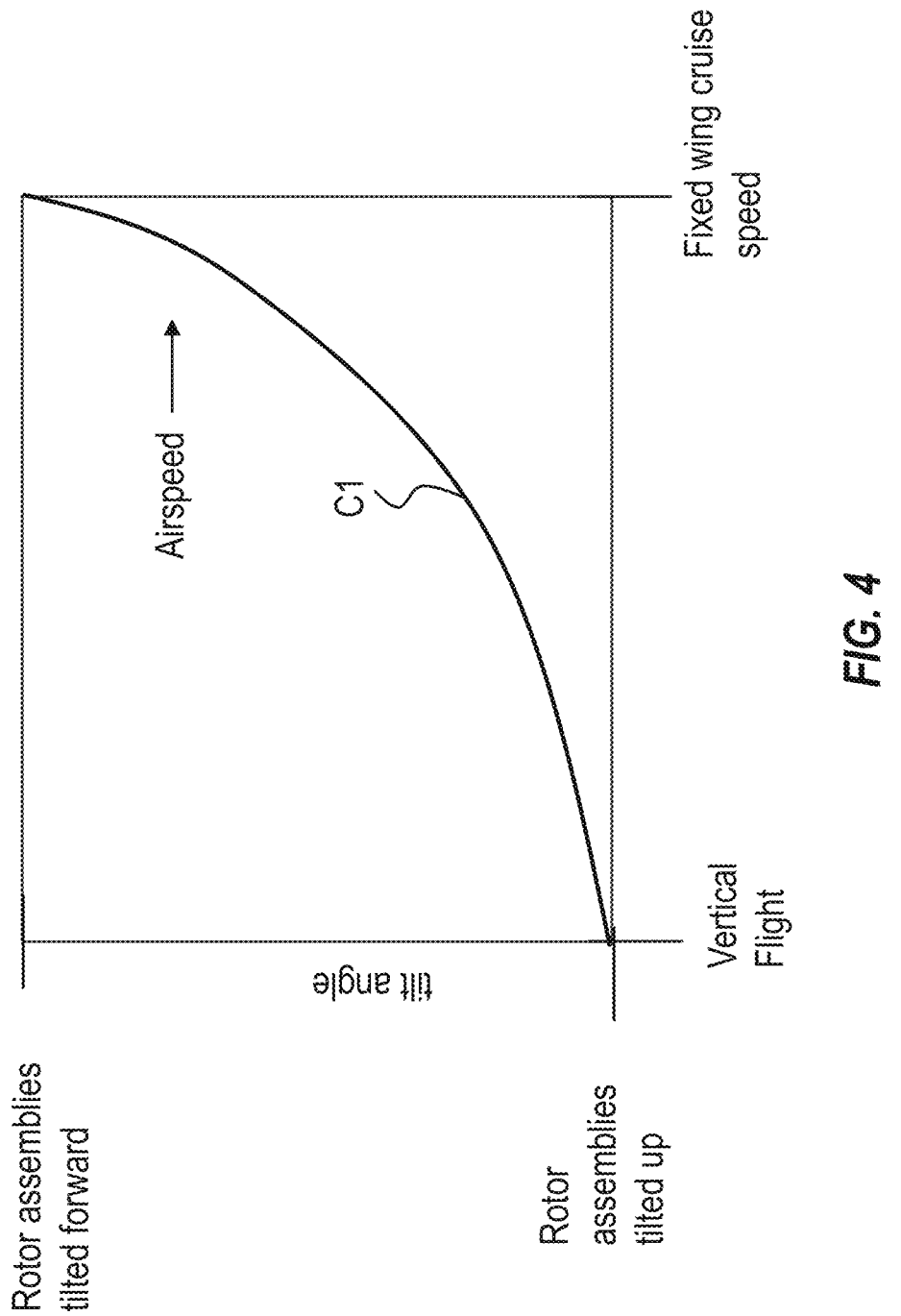
FIG. 4 presents an illustrative graph of rotor assembly tilt angle versus airspeed of an aircraft vehicle, according to certain embodiments.

In various embodiments, the tilt angles of rotor assemblies 105 (as shown, for example, in FIGS. 2A-2C) may depend on the airspeed of the vehicle, and this dependence can be characterized by a suitable profile curve. An example of such a profile curve C1 is shown in FIG. 4, illustrating a non-linear relationship between the tilt angle of rotor assemblies 105 and the airspeed of aircraft vehicle 100. When flying vertically, rotor assemblies are tilted up (e.g., the tilt angle is 0 degrees) and when flying horizontally, rotor assemblies are tilted forwards (e.g., the tilt angle is 90 degrees). Profile C1 illustrates possible tilt angles that can be selected when aircraft vehicle 100 is operating in a mode that combines both hovering and horizontal cruising.

Figure 5C:
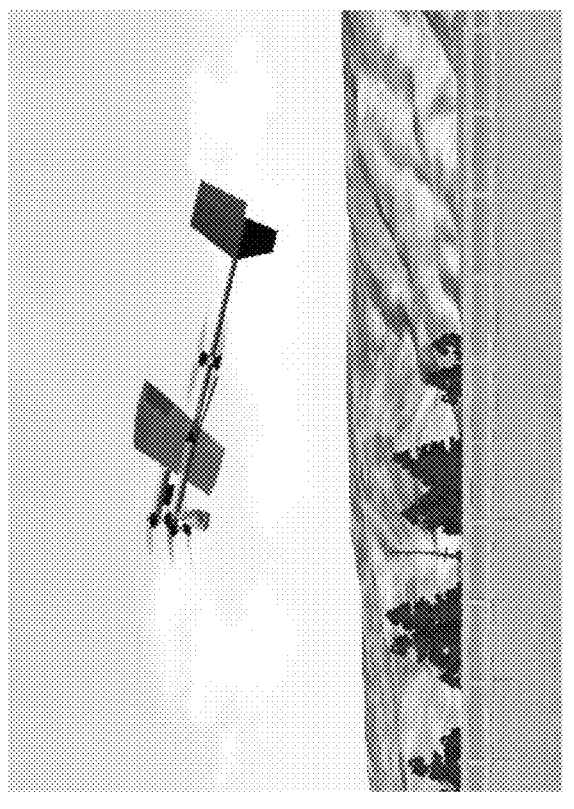
FIGS. 5A-5C display different operational modes of an aircraft vehicle, according to certain embodiments.
Figure 5A:
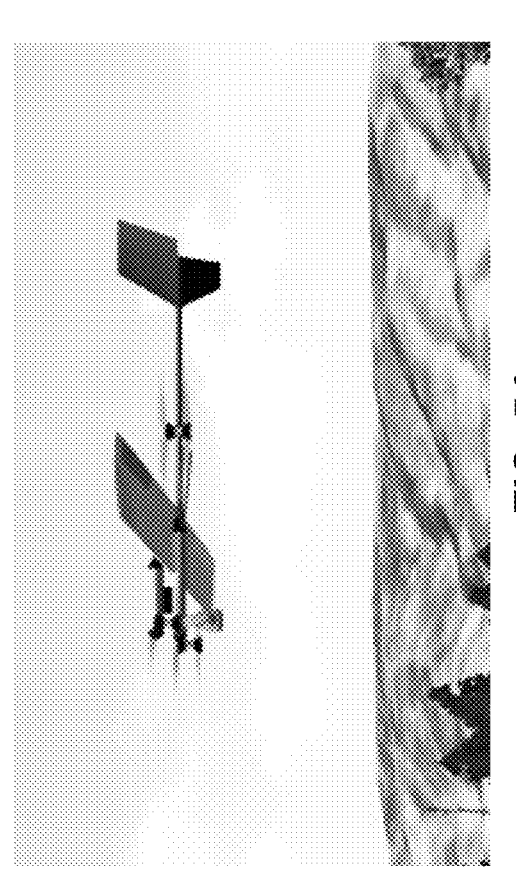
Figure 5B:
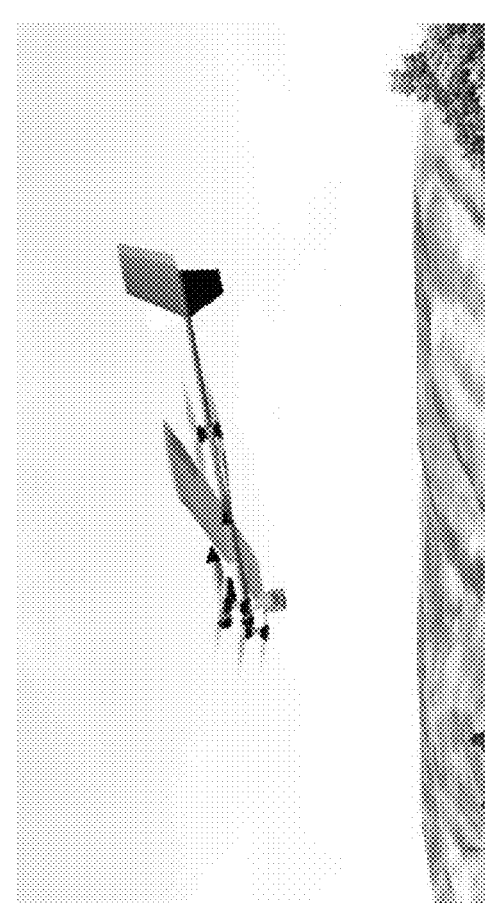

Examples of vertical flight modes for the aircraft vehicle are schematically shown in FIGS. 5A-5C. In FIG. 5A, the aircraft vehicle is flying in a vertical hovering mode, indicated by the vertically positioned rotor assemblies. In FIG. 5B, the left and right rotor assemblies are slightly tilted, and the rotational speeds of the rotor assemblies are adjusted to produce lift, causing the aircraft vehicle to tilt forward. In FIG. 5C, a different tilt angle for the left and right rotor assemblies is selected, along with different rotational speeds, causing the aircraft vehicle to tilt backward.

Figure 6:
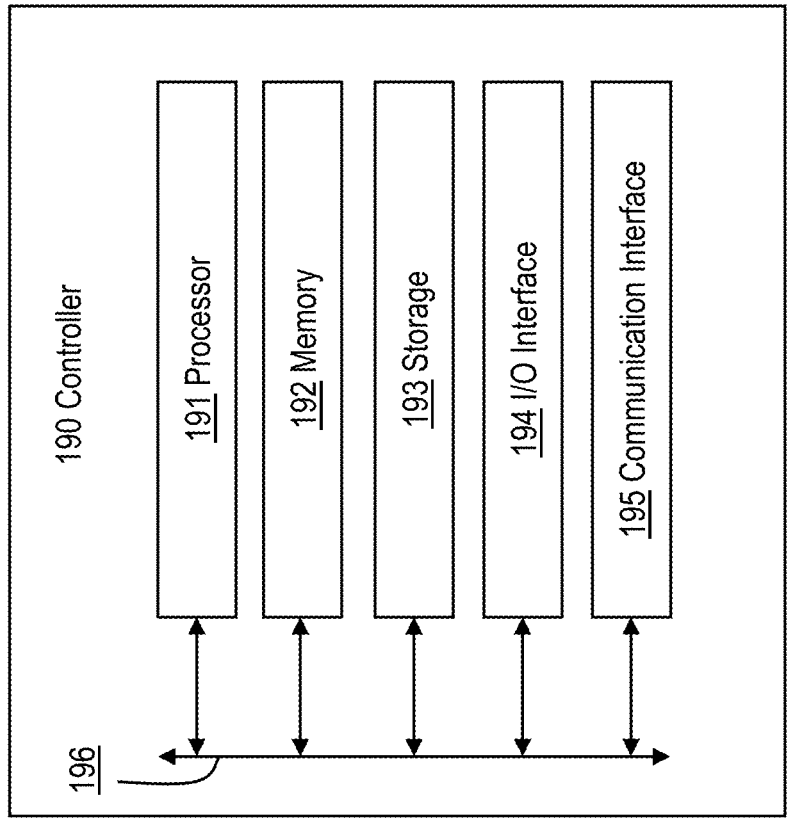
FIG. 6 is a schematic of a controller, according to certain embodiments.

FIG. 6 illustrates controller 190 of aircraft vehicle 100 (as previously shown in FIG. 1A), in accordance with certain embodiments. In particular embodiments, controller 190 performs one or more steps of the methods described or illustrated herein. Controller 190 also provides the functionality described or illustrated in various embodiments. Additionally, software running on controller 190 can perform one or more steps of the methods or provide the functionality described herein. References to controller 190 may encompass a computing device, and vice versa, where appropriate. Moreover, references to a controller may encompass one or more controllers, where appropriate.

This disclosure contemplates any suitable number of controllers 190. Controller 190 can take any suitable physical form. For example, and not by way of limitation, controller 190 may be an embedded computer system, a system-on-chip (SoC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, controller 190 may include one or more controllers 190; be unitary or distributed; span multiple locations; span multiple machines; span multiple data centers; or reside in a cloud, which may include one or more cloud components in one or more networks. Where appropriate, one or more controllers 190 may perform, without substantial spatial or temporal limitation, one or more steps of one or more methods described or illustrated herein. As an example, and not by way of limitation, one or more controllers 190 may perform one or more steps in real-time or in batch mode, or at different times or locations, as described or illustrated herein.

In particular embodiments, controller 190 may include a processor 191, memory 192, storage 193, an input/output (I/O) interface 194, a communication interface 195, and a bus 196. Although this disclosure describes and illustrates a particular controller with a specific number of components arranged in a particular manner, it contemplates any suitable controller with any suitable number of components in any suitable arrangement.

In particular embodiments, processor 191 includes hardware for executing instructions, such as those making up a computer program. As an example, and not by way of limitation, to execute instructions, processor 191 may retrieve (or fetch) the instructions from an internal register, an internal cache, memory 192, or storage 193; decode and execute them; and then write one or more results to an internal register, an internal cache, memory 192, or storage 193. In particular embodiments, processor 191 may include one or more internal caches for data, instructions, or addresses. This disclosure contemplates processor 191 including any suitable number of any suitable internal caches, where appropriate. As an example, and not by way of limitation, processor 191 may include one or more instruction caches, one or more data caches, and one or more translation lookaside buffers (TLBs). Instructions in the instruction caches may be copies of instructions in memory 192 or storage 193, and the instruction caches may speed up retrieval of those instructions by processor 191. Data in the data caches may be copies of data in memory 192 or storage 193 for instructions executing at processor 191 to operate on; the results of previous instructions executed at processor 191 for access by subsequent instructions executing at processor 191 or for writing to memory 192 or storage 193; or other suitable data. The data caches may speed up read or write operations by processor 191. The TLBs may speed up virtual-address translation for processor 191. In particular embodiments, processor 191 may include one or more internal registers for data, instructions, or addresses. This disclosure contemplates processor 191 including any suitable number of any suitable internal registers, where appropriate. Where appropriate, processor 191 may include one or more arithmetic logic units (ALUs); be a multi-core processor; or include one or more processors. Although this disclosure describes and illustrates a particular processor, this disclosure contemplates any suitable processor.

In particular embodiments, memory 192 includes main memory for storing instructions for processor 191 to execute or data for processor 191 to operate on. As an example, and not by way of limitation, controller 190 may load instructions from storage 193 or another source (such as, for example, another controller 190) to memory 192. Processor 191 may then load the instructions from memory 192 to an internal register or internal cache. To execute the instructions, processor 191 may retrieve the instructions from the internal register or internal cache and decode them. During or after the execution of the instructions, processor 191 may write one or more results (which may be intermediate or final results) to the internal register or internal cache. Processor 191 may then write one or more of those results to memory 192. In particular embodiments, processor 191 executes only instructions in one or more internal registers or internal caches or in memory 192 (as opposed to storage 193 or elsewhere) and operates only on data in one or more internal registers or internal caches or in memory 192 (as opposed to storage 193 or elsewhere). One or more memory buses (which may each include an address bus and a data bus) may couple processor 191 to memory 192. Bus 196 may include one or more memory buses, as described below. In particular embodiments, one or more memory management units (MMUs) reside between processor 191 and memory 192 and facilitate accesses to memory 192 requested by processor 191. In particular embodiments, memory 192 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 192 may include one or more memories, where appropriate. Although this disclosure describes and illustrates a particular memory, this disclosure contemplates any suitable memory.

In particular embodiments, storage 193 includes mass storage for data or instructions. As an example, and not by way of limitation, storage 193 may include a hard disk drive (HDD), a floppy disk drive, flash memory, an optical disc, a magneto-optical disc, magnetic tape, or a Universal Serial Bus (USB) drive or a combination of two or more of these. Storage 193 may include removable or non-removable (or fixed) media, where appropriate. Storage 193 may be internal or external to controller 190, where appropriate. In particular embodiments, storage 193 is a non-volatile, solid-state memory. In particular embodiments, storage 193 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), flash memory, or a combination of two or more of these. This disclosure contemplates mass storage 193 taking any suitable physical form. Storage 193 may include one or more storage control units facilitating communication between processor 191 and storage 193, where appropriate. Where appropriate, storage 193 may include one or more storages. Although this disclosure describes and illustrates particular storage, this disclosure contemplates any suitable storage.

In particular embodiments, I/O interface 194 includes hardware, software, or both, providing one or more interfaces for communication between controller 190 and one or more I/O devices. Controller 190 may include one or more of these I/O devices, where appropriate. One or more of these I/O devices may enable communication between a person and controller 190. As an example, and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 194 for them. Where appropriate, I/O interface 194 may include one or more device or software drivers enabling processor 191 to drive one or more of these I/O devices. I/O interface 194 may include one or more I/O interfaces 194, where appropriate. Although this disclosure describes and illustrates a particular I/O interface, this disclosure contemplates any suitable I/O interface.

In particular embodiments, communication interface 195 includes hardware, software, or both providing one or more interfaces for communication (such as, for example, packet-based communication) between controller 190 and one or more other controllers 190 or one or more networks. As an example, and not by way of limitation, communication interface 195 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 195 for it. As an example, and not by way of limitation, controller 190 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, controller 190 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network, a Long-Term Evolution (LTE) network, or a 5G network), or other suitable wireless network or a combination of two or more of these. Controller 190 may include any suitable communication interface 195 for any of these networks, where appropriate. Communication interface 195 may include one or more communication interfaces 195, where appropriate. Although this disclosure describes and illustrates a particular communication interface, this disclosure contemplates any suitable communication interface.

In particular embodiments, bus 196 includes hardware, software, or both coupling components of controller 190 to each other. As an example, and not by way of limitation, bus 196 may include an Accelerated Graphics Port (AGP) or other graphics bus, an Enhanced Industry Standard Architecture (EISA) bus, a front-side bus (FSB), a HYPER-TRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 196 may include one or more buses 196, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Methods of Operating the Aerial Vehicle

Controller 190 is configured to control left coaxial counter-rotating rotor assembly 120, right coaxial counter-rotating rotor assembly 110, and tail coaxial counter-rotating rotor assembly 150 by managing the tilt angles of rotor assemblies 120 and 110, as well as the rotational speeds of the various rotor blades in assemblies 120, 110, and 150. Furthermore, when wings 170 and tail 160 are present, controller 190 can be configured to actuate various control surfaces, such as surfaces 171, 164, 166, and 168.

Figure 7:
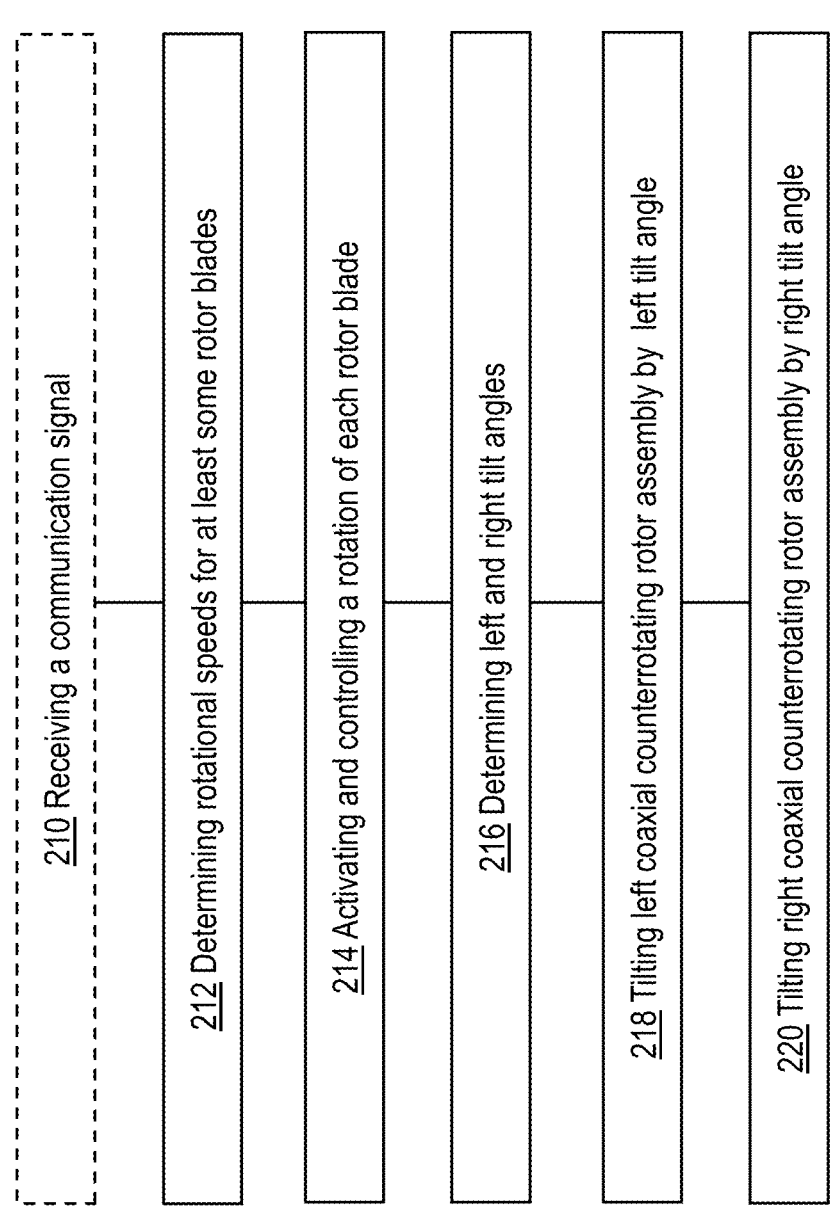
FIG. 7 is an example method of controlling rotor assemblies of an aircraft vehicle, according to certain embodiments.

FIG. 7 illustrates a method 200 for controlling the operational parameters of rotor assemblies 120, 110, and 150. These operational parameters include the rotational speeds of the various rotor blades and the tilt angles of rotor assemblies 120 and 110. In various cases, steps of method 200 may be implemented by controller 190.

Method 200 includes an optional step 210 of receiving a communication signal via a communication unit of the aircraft vehicle, whereby the communication signal determines the flight trajectory. In an illustrative embodiment, the communication signal may be sent by a remote controller and received by the communication unit, which may be part of communication interface 195 of controller 190. The communication signal may include details such as the trajectory path, velocity along the trajectory path, and instantaneous velocity. In some cases, if a communication signal is not received, the trajectory path and velocity along the trajectory path may be determined by processor 191 of controller 190 based on the task assigned to the aircraft vehicle, such as delivering a payload to a specified location by a particular time.

At step 212, method 200 includes determining the rotational speeds for at least some rotor blades, including at least left and right front rotor blades 121 and 111, and/or left and right aft rotor blades 122 and 112, and/or top and bottom rotor blades 151 and 152. The determination of these rotational speeds may be based on the required velocity at each point along the trajectory path.

At step 214, method 200 includes activating and controlling the rotation of one or more sets of rotor blade, such as left and right front rotor blades 121 and 111, left and right aft rotor blades 122 and 112, as well as top and bottom rotor blades 151 and 152. This activation and control are achieved using the corresponding rotor motors, including left and right front motors 123 and 113, left and right aft motors 124 and 114, top motor 153, and bottom motor 154, as shown in FIG. 1A. In some cases, processor 191 of controller 190 may adjust or activate the rotational speeds for different rotors. For example, controller 190 may activate left or right sets of rotor blades such as left front rotor blades 121, and/or right front rotor 110, and/or left aft rotor blades 122, and/or right aft rotor blades 112, and/or top or bottom rotor blades 151 or 152 by applying power to one or more of the associated motors. In some cases, such adjustment or activation can be performed based on environmental conditions such as wind, rain, fog, or any other factors that could affect the task assigned to aircraft vehicle 100. Further, depending on the type of payload (e.g., its weight and aerodynamic properties) and the amount of fuel or electrical charge available to power the various components of aircraft vehicle 100, the operational parameters may be adjusted to optimize performance for a particular mission.

At step 216, method 200 includes determining left and right tilt angles for corresponding left and right coaxial counterrotating rotor assemblies 120 and 110 based on the desired trajectory path and desired velocity along the trajectory path. In some cases, a relationship between an airspeed and tilt angles for left and right rotor assemblies, such as profile C1, as shown in FIG. 4, can be used for determining tilt angles for corresponding left and right coaxial counterrotating rotor assemblies 120 and 110. Additionally, flight direction can be used for determining the tilt angles for corresponding left and right coaxial counterrotating rotor assemblies 120 and 110.

In some cases, several different configurations of operational parameters may lead to the same velocity values and trajectory paths. In such situations, an optimization problem can be formulated and solved by processor 191 to select the most optimal set of parameters that minimize a cost function L, which depends on operational parameters pi. In some embodiments, this minimization may involve reducing the fuel needed to complete the mission, decreasing flight time, shortening the travel distance, or addressing other considerations that can be incorporated into the cost function L. Additional factors such as optimizing the payload efficiency, enhancing safety measures, and reducing maintenance requirements can also be included in the cost function to ensure a comprehensive optimization approach.

When the exact trajectory path and/or velocity along the trajectory path are not specified, the optimization problem can include determining an optimal trajectory path and how to perform the flight along that path. In these cases, the cost function may be formulated to (1) minimize the fuel needed for a specific mission, (2) minimize the distance flown by the aircraft vehicle to complete the mission, (3) minimize wear and tear on the aircraft vehicle based on the torques and forces experienced by various components during the mission, and other similar considerations.

In some cases, this minimization problem may be solved subject to specific constraints, such as maximum velocity, maximum altitude, maximum acceleration, and similar limitations for the aircraft vehicle. These constraints can be formulated to prevent destabilization of the aircraft vehicle. For example, a constraint on the rate at which the left and right rotor assemblies 120 and 110 can be tilted may be important to ensure the stability of aircraft vehicle 100.

At step 218, method 200 includes tilting left coaxial counterrotating rotor assembly 120 by the left tilt angle, as determined in step 214. This tilting is accomplished using servo motor 125, as previously discussed. Similarly, at step 220, method 200 includes tilting right coaxial counterrotating rotor assembly 110 by the right tilt angle, as determined in step 214. This tilting is accomplished using servo motor 115, as also previously discussed.

In various embodiments, aircraft vehicle 100 may be equipped with sensors to detect the failure of one or more components. Based on the detected failure, the system can adjust various operational parameters to respond appropriately. Possible emergency procedures include autonomous landing, either by finding a safe spot or deploying a parachute for controlled descent. The vehicle may return to its takeoff location or a predefined safe area, hover and await further instructions, or glide to a safe area to minimize damage. Other procedures involve rerouting the flight path to avoid hazards, performing a controlled engine shutdown, or activating redundant systems to take over for failed components. In addition, the UAV may signal distress to ground control, maintain a safe altitude, or descend into water if flying over it. The vehicle may also jettison nonessential or hazardous payloads to reduce weight and improve maneuverability, activate an emergency beacon to aid in locating it, or, in critical situations, initiate a self-destruct mechanism to prevent causing harm. These measures ensure that the aircraft vehicle can effectively respond to various failure scenarios, enhancing safety and mission success rates.

In one illustrative embodiment, controller 190 of aircraft vehicle 100 is configured to detect an irregularity in an operation of one or more of the sets of rotor blades, such as left front rotor blades, left aft rotor blades, right front rotor blades, right aft rotor blades, top rotor blades, or bottom rotor blades, and, in response to the detected irregularity, adjust power distribution to the remaining operational sets of rotor blades to maintain the flight trajectory. The irregularity may be identified using one or more sensors on aircraft vehicle 100.

In one embodiment, the irregularity may be identified by a reduced rotational speed of the one or more sets of rotor blades as compared to the requested speed from the controller for these sets of rotor blades. This reduced speed can be determined by suitable rotational speed sensors, such as optical tachometers, Hall Effect sensors, proximity sensors, and similar devices.

In another embodiment, an irregularity may be identified based on uneven rotation of the one or more sets of rotor blades, such as if there are certain angles over which the rotation of the rotor blades slows down. This uneven rotation can also be detected by optical tachometers, Hall Effect sensors, and similar devices. Additionally, the unevenness of the rotations may coincide with vibrations, which can be detected via a vibrational sensor.

In some cases, even when the rotations of the one or more sets of rotor blades are relatively even, a vibration sensor can detect vibrations that indicate a possible irregularity in one or more components of aircraft vehicle 100.

Particular irregularities may be observed during specific flight regimes characterized by certain orientations, flight speeds, accelerations, and other conditions of aircraft vehicle 100. When such an irregularity is determined by one or more sensors, it may be advisable to avoid that specific flight regime to prevent exacerbating conditions that could lead to failures of various components due to detected irregularities.

The irregularity may further be identified by detecting a change in noise generated by the one or more sets of rotor blades. The change in noise can be determined using any suitable sound sensors.

In some cases, besides adjusting power distribution to the remaining operational sets of rotor blades to maintain the flight trajectory, power to sets of rotor blades that experience irregularity may also be adjusted. For example, power to sets of such rotor blades can be reduced or turned off.

In some cases, controller 190 of aircraft vehicle 100 is configured to determine a likelihood of a particular type of a failure of one or more sets of rotor blades. The failure may be identified by at least one of a reduced rotational speed of the one or more sets of rotor blades as compared to the requested speed from the controller for these sets of rotor blades, a detection of uneven rotation for the one or more sets of rotor blades, or a change in noise generated by the one or more sets of rotor blades, as described above. Further, in response to the determined likelihood, controller 190 may be configured to adjust power distribution to the one or more of the sets of rotor blades to minimize impact of the failure.

FIG. 8 shows another illustrative method 300 for controlling the operational parameters of rotor assemblies 120, 110, and 150. In various cases, steps of method 300 may be implemented by controller 190.

These operational parameters include the rotational speeds of the various rotor blades of rotor assemblies 120 and 110. Method 300 includes, at step 310 determining a lift produced by a rotor assembly. To determine the lift produced by rotor assemblies, such one of rotor assemblies 120, 110, or 150, a combination of sensors and aerodynamic principles can be employed. Load cells or strain gauges can be integrated into the aircraft vehicle structure to measure the forces acting on rotor shafts, providing direct readings of the vertical lift component. Additionally, or alternatively, pressure sensors can be placed on rotor blades of the rotors of the rotor assembly to monitor the pressure distribution, which can then be integrated to calculate the lift force. Additionally, anemometers or laser Doppler velocimetry (LDV) systems can measure the velocity of the airflow around rotors, allowing for the estimation of aerodynamic forces. Further, accelerometers and gyroscopes can further aid by measuring the aircraft vehicle's movements, contributing to a comprehensive analysis of the lift generated. By combining these sensor data with aerodynamic models, the lift produced by the rotors of the rotor assembly can be determined.

Furthermore, the lift may be inferred by knowing the payload of the aircraft vehicle, rotational speeds of different rotor blades, tilt of different rotors, speed of the aircraft vehicle, as well as environmental conditions in which the aircraft vehicle operates. The environmental conditions can include the altitude of the aircraft vehicle, winds, air humidity, and temperature.

At step 312, method 300 involves comparing the determined lift to a target lift value expected at a specific point in the aircraft vehicle's trajectory to identify any discrepancy. At step 314, method 300 includes adjusting the rotational speed of one or more rotors of any one of rotor assemblies 120, 110, or 150, to minimize this discrepancy. Additionally, if one or more rotors are not rotating at the prescribed speed (e.g., due to failure or suboptimal performance), controller 190 may increase the rotational speed of another rotor to maintain the correct lift and ensure proper flight of the aircraft. In some cases, the speeds of multiple rotors may be adjusted to compensate for the failure or subpar performance of a particular rotor in the assembly.

FIG. 9 shows another illustrative method 400 for controlling the operational parameters of rotor assemblies 120, 110, and 150. In various cases, steps of method 400 may be implemented by controller 190.

Method 400 includes, at step 410, determining a thrust produced by rotor assemblies 120 and 110. To determine the thrust produced by these rotor assemblies, a combination of sensors and aerodynamic principles can be employed, similar to sensors for determining the lift characteristics of the aircraft vehicle. For example, anemometers or laser Doppler velocimetry (LDV) systems can measure the velocity of the airflow around rotors, allowing for the estimation of aerodynamic forces. Further, accelerometers and gyroscopes can further aid by measuring the aircraft vehicle's movements, contributing to a comprehensive analysis of the thrust generated.

Furthermore, the thrust may be inferred by knowing the payload of the aircraft vehicle, rotational speeds of different rotor blades, tilt of different rotors, speed of the aircraft vehicle, as well as environmental conditions in which the aircraft vehicle operates. The environmental conditions can include the altitude of the aircraft vehicle, winds, air humidity, and temperature.

At step 412, method 400 involves comparing the determined thrust to a target thrust value expected at a specific point in the aircraft vehicle's trajectory to identify any discrepancy. At step 414, method 400 includes adjusting the rotational speed of one or more rotors of any one of rotor assemblies 120, and 110, to minimize this discrepancy. Additionally, if one or more rotors are not rotating at the prescribed speed (e.g., due to failure or suboptimal performance), controller 190 may increase the rotational speed of another rotor to maintain the desired thrust and ensure proper flight of the aircraft. In some cases, the speeds of multiple rotors may be adjusted to compensate for the failure or subpar performance of a particular rotor of any one of rotor assemblies 120, or 110.

FIG. 10 shows another illustrative method 500 for deactivating or activating rotations of the left and right aft rotor blades 122 and 112, as shown, for example, in FIGS. 2B and 2C. For example, at step 510, when flying with tilted rotor assemblies 120 and 110, as shown, for example, in FIG. 2C, method 500 may include, at step 510, deactivating rotations of left and right aft rotor blades 122 and 112 when flying above a threshold airspeed, thereby causing folding of the left and right aft rotor blades. The threshold airspeed may correspond to the airspeed that needs to be maintained to ensure that lift for the aircraft vehicle is such that the aircraft generally performs a non-descending flight. When the aircraft vehicle flies below the threshold airspeed, additional thrust can be generated at step 512 by activating rotations of left and right aft rotor blades 122 and 112, thereby causing unfolding of the left and right aft rotor blades (if these rotor blades were previously folded).

Rotor Assembly for the Aerial Vehicle and Operation of the Rotor Assembly

Figure 11A:
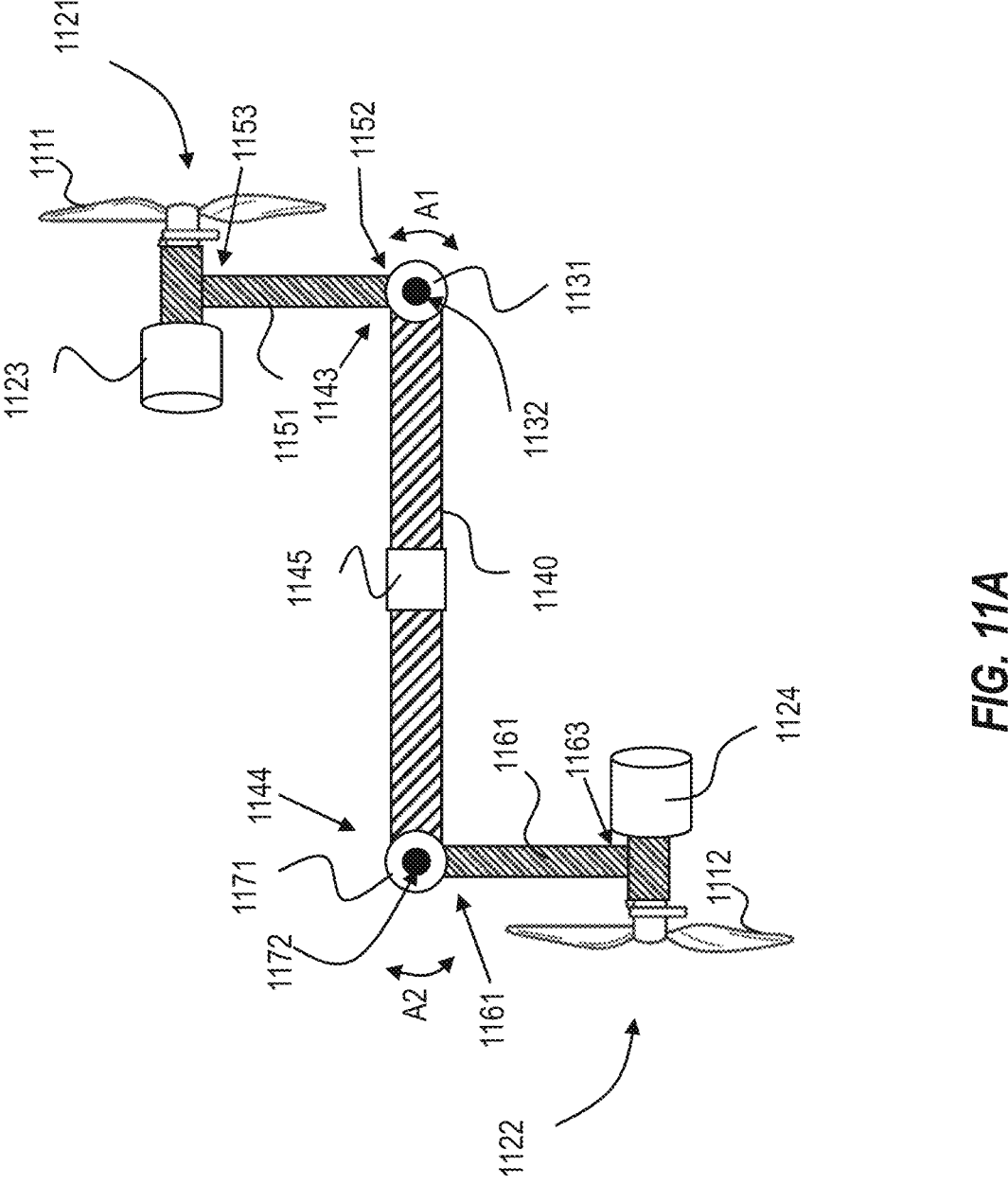
FIGS. 11A and 11B show views of an example assembly for controlling an orientation of a counterrotating rotor, according to certain embodiments.

It should be noted that tilting rotors, as shown, for example, in FIGS. 2A-2C, represent one example embodiment, and other tilting mechanisms can be used. For example, an assembly for controlling the orientation of counterrotating rotors may include an assembly that comprises several members and hinge elements defining axes for the rotation of the counterrotating rotors. For example, FIG. 11A shows an example embodiment of an assembly 1100 that includes a first rotor 1121 having first rotor blades 1111, a second rotor 1122 having second rotor blades 1112, a first motor 1123 configured to rotate first rotor 1121, a second motor 1124 configured to rotate second rotor 1122, and a main connecting element 1140 having a first end 1143 and a second end 1144 opposite first end 1143. Main connecting element 1140 serves as the structural backbone, facilitating the attachment of two rotatable connecting members: a first connecting member 1151 and a second connecting member 1161.

First connecting member 1151 includes a first coupling end 1152 and a first outer end 1153. First coupling end 1152 is configured to be rotatably coupled to the first end 1143 via a first hinge 1131 having a first rotational axis 1132, such that the first connecting member 1151 is configured to rotate around first rotational axis 1132 as shown by arrow A1.

Additionally, second connecting member 1161 includes a second coupling end 1162 and a second outer end 1163. Second coupling end 1162 is configured to be rotatably coupled to second end 1144 via a second hinge 1171 having a second rotational axis 1172, such that the second connecting member 1161 is configured to rotate around second rotational axis 1172 as shown by arrow A2. In various embodiments, the second rotational axis 1172 is configured to be parallel to the first rotational axis 1132.

In various embodiments, assembly 1100 can represent one of the rotor assemblies for an aircraft vehicle. For example, assembly 1100 can be used to replace a left coaxial counterrotating rotor assembly 120 and/or a right coaxial counterrotating rotor assembly 110, as shown in FIG. 1B. In such cases, assembly 110 can be coupled to a lift boom, such as lift boom 130, as shown in FIG. 1B.

In an example embodiment, when coupling assembly 1100 to a lift boom, the main connecting element 1140 can be attached to the lift boom via a coupling element, which can include any suitable mechanism, such as a bolt, clamp, welded joint, rivet, flange connection, or any other suitable connection.

Figure 11B:
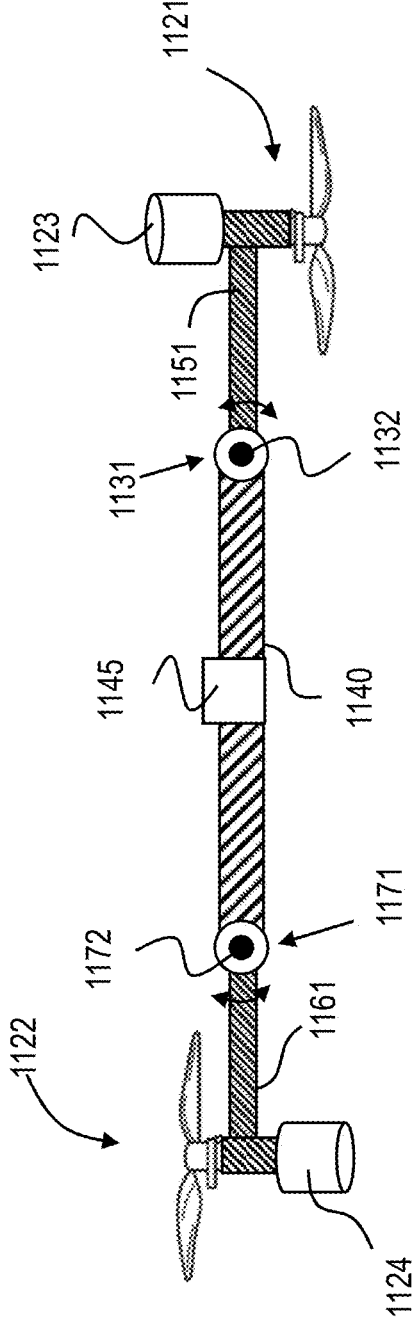

FIG. 11B illustrates assembly 1100, where the first connecting member 1151 and the second connecting member 1161 are shown in rotated positions about their respective rotational axes 1132 and 1172. The first connecting member 1151 has rotated about the first rotational axis 1132, altering its orientation relative to the main connecting element 1140. This rotation repositions the first rotor 1121 and first motor 1123, which remain mounted at the outer end of the first connecting member 1151. Similarly, the second connecting member 1161 has rotated about the second rotational axis 1172, changing its alignment relative to the main connecting element 1140. As a result, the second rotor 1122 and second motor 1124, mounted at the outer end of the second connecting member 1161, are also repositioned. The main connecting element 1140 remains fixed and serves as the structural backbone of the assembly, connecting hinges 1131 and 1171 that allow for the controlled rotation of the first and second connecting members 1151 and 1161. Central coupling element 1145 remains stationary and solidly couples the main connecting element 1140 to an aircraft vehicle (e.g., to a lift boom of the aircraft vehicle). In various embodiments, an actuator assembly (not shown in FIGS. 11A and 11B) can apply torque to connecting members 1151 and 1161 to dynamically alter the positioning of the rotors, enabling the assembly to adapt to various aerodynamic or operational requirements such as transitioning between hover and forward flight or stabilizing the aircraft vehicle.

In various embodiments, first rotor blades 1111, as shown in FIG. 11A, have a first pitch, while second rotor blades 1112 have a second pitch that may be lower than the first pitch. This differential pitch configuration allows the assembly to optimize aerodynamic performance by tailoring the lift and thrust generation of each rotor to specific operational needs. The higher pitch of the first rotor blades provides greater thrust for forward propulsion, while the lower pitch of the second rotor blades ensures reduced drag and smoother operation, enhancing stability and energy efficiency during various flight modes.

In some embodiments, the actuator assembly of assembly 1100 can be configured to tilt the first rotor 1121 by a first tilt angle while simultaneously tilting the second rotor 1122 by a second tilt angle. In various embodiments, these tilt angles are equal in magnitude but opposite in direction. By balancing the opposing tilt angles, the system maintains equilibrium while adapting to various operational requirements, such as hover, forward flight, or other dynamic maneuvers.

In some embodiments, the first and second tilt angles can range from a vertical zero-degree orientation to a horizontal ninety-degree orientation. This range allows the rotors to transition from a fully vertical position for lift and hover operations to a fully horizontal position for forward propulsion. In some cases, assembly 1100 can further allow the first and second tilt angles to include negative values. This feature enhances the flexibility of the assembly, enabling the rotors to tilt beyond the standard zero-degree vertical orientation in the opposite direction. Negative tilt angles may be beneficial for specific aerodynamic conditions, such as counteracting wind resistance, moving in a backward direction and/or improving stability during complex maneuvers. In some cases, the negative values for the first and second tilt angles can range between –20 degrees and 0 degrees.

Further, similar to the embodiments described above, the second rotor blades of assembly 1100 can be configured to fold when the second tilt angle reaches ninety degrees in amplitude. This folding mechanism is particularly useful in specific operational scenarios, such as when transitioning to a horizontal orientation for forward flight or when reducing drag in certain conditions. In some cases, the second rotor blades are configured to fold when the axis of rotation of the second rotor aligns with a main axis extending along the main connecting member from the second rotor to the first rotor, and a movement of an aircraft that uses assembly 1100 exceeds a threshold value in a direction along the main axis.

In some cases, the actuator assembly for rotating the first and second connecting members 1151 and 1161 can comprise servo motors incorporated as part of hinges 1131 and 1171, such that these servo motors are configured to perform rotation of the first and second connecting members 1151 and 1161.

Figure 12:
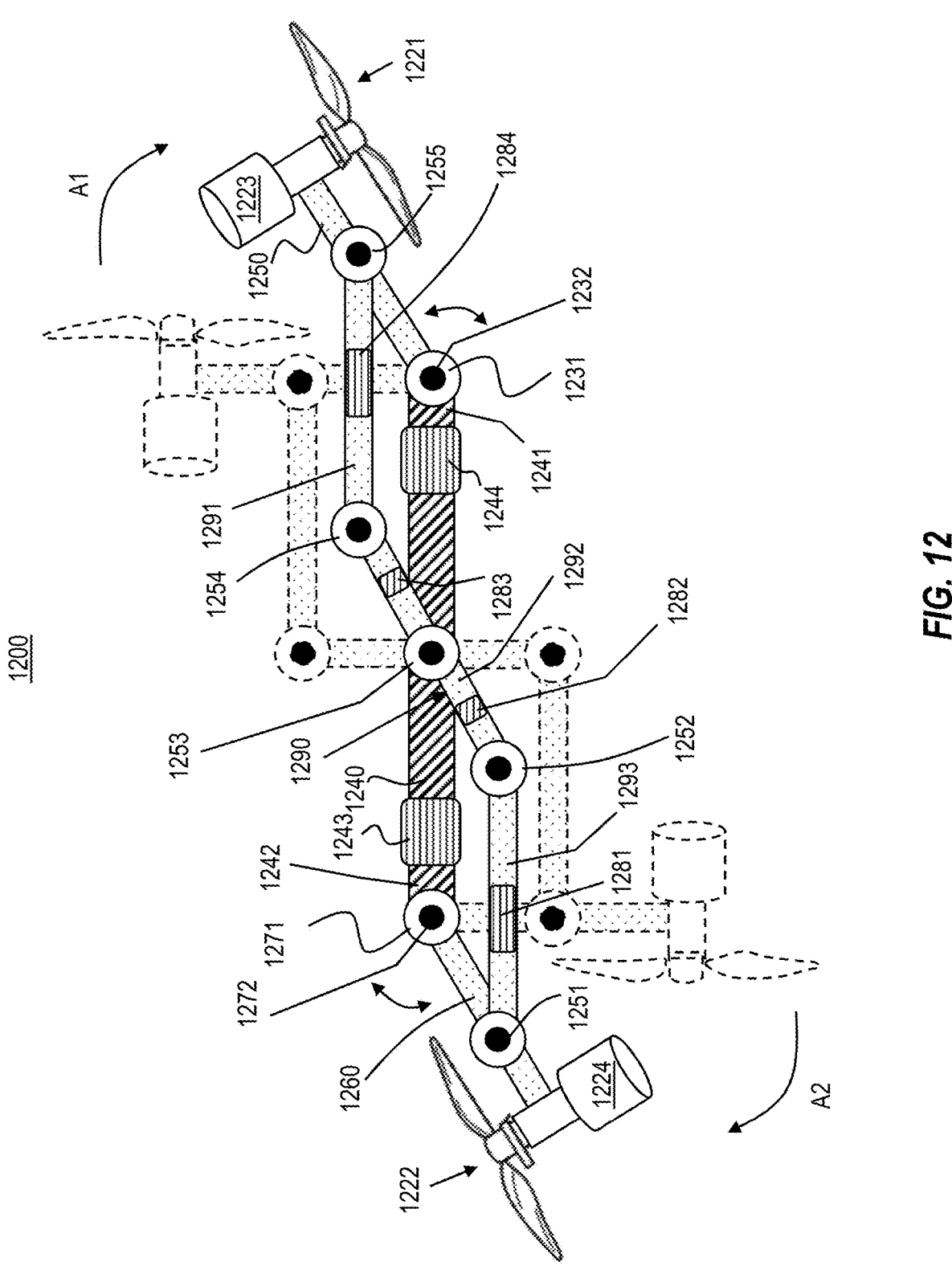
FIG. 12 shows an example assembly for controlling an orientation of a counterrotating rotor having an actuator member, according to certain embodiments.

FIG. 12 illustrates an example embodiment of assembly 1200. Assembly 1200 comprises a main connecting member 1240, a first connecting member 1250, a second connecting member 1260, and an actuator assembly 1290 that includes an actuator member 1292, elements 1291 and 1293, and rotatable couplings 1251-1255. The assembly also includes a first rotor 1221 and a second rotor 1222, each driven by corresponding motors 1223 and 1224, as well as hinges 1231 and 1271. The dashed lines indicate the original positions of various components prior to the rotation of the connecting members.

Main connecting member 1240 serves as the central structural backbone of the assembly. It features a first end 1241 and a second end 1242, which provide mounting points for the rotatable first and second connecting members 1250 and 1260. In various cases, a first connecting member 1250 is rotatably connected at its first coupling end to a first end 1241 of main connecting member 1240 via a hinge 1231, which defines a second rotational axis 1232. The first outer end of first connecting member 1250 supports first rotor 1221 and first motor 1223 for actuation of first rotor 1221.

Further, the second coupling end of second connecting member 1260 is rotatably connected to second end 1242 of the main connecting member 1240 via a hinge 1271, which defines first rotational axis 1272. The second outer end of second connecting member 1260 supports second rotor 1222 and second motor 1224 for actuation of second rotor 1222.

Further, FIG. 12 illustrates actuator assembly 1290, which includes an actuator member 1292. Actuator member 1292 has a first actuator end that forms part of rotatable coupling 1252 and a second actuator end that forms part of rotatable coupling 1254. Each end, in some cases, can include a hole through which the respective coupling is established. In some cases, each hole can incorporate bearings for establishing the rotatable coupling.

In various embodiments actuator member 1292 is rotatably coupled to main connecting member 1240 via a rotatable coupling 1253. Rotatable coupling 1253, as well as any other rotatable coupling, such as rotatable couplings 1251-1255 as well as 1231 and 1271, as shown in FIG. 12, can be implemented using a mechanical joint designed to allow rotation about an axis around which the rotation is desired (in FIG. 12 such axes are perpendicular to the plane of the page). One approach for implementing such rotational coupling includes a pin-and-bearing joint, where the adjacent ends of the connected members, such as the actuator member 1292 and a first actuator element 1291 include aligned holes through which a pin is inserted. Bearings or bushings around the pin minimize friction, facilitating smooth rotation while maintaining a secure connection. Alternatively, any other suitable rotatable connection can be used (e.g., clevis-and-bracket assembly) could be used.

Actuator member 1292 is connected at its first actuator end to the first end of first actuator element 1291 via a rotatable coupling 1254. The second end of actuator element 1291 is further connected to first connecting member 1250 at a rotatable coupling point 1255, located between the first outer end and the first coupling end of the first connecting member 1250. The rotatable coupling joint at connecting point 1255 allows for the movement of first actuator element 1291 and rotation of the first connecting member 1250. For example, a forward movement of first actuator element 1291, as illustrated by arrow A1, causes the first connecting member 1250 to rotate, transitioning first rotor 1221 from a horizontal orientation (as shown by the dashed line) to a vertical orientation, thereby decreasing the tilt angle from ninety degrees to zero degrees.

Further, actuator member 1292 is connected at its second actuator end to an end of a second actuator element 1293 via a rotatable coupling 1252. Another end of second actuator element 1293 is further connected to second connecting member 1260 at a rotatable coupling point 1251, located between the second outer end and the second coupling end of the second connecting member 1260. The rotatable coupling joint at connecting point 1251 allows for the movement of second actuator element 1293 and rotation of the second connecting member 1260. For example, a backward movement of actuator element 1293 causes the second connecting member 1260 to rotate, as illustrated by arrow A2, transitioning the second rotor 1222 from a horizontal orientation (as shown by the dashed line) to a vertical orientation, thereby decreasing the tilt angle from ninety degrees to zero degrees.

In various embodiments, the movement of actuator assembly 1290 can be accomplished via a servo motor. The servo motor can be configured to rotate actuator member 1292, thereby applying torque to first and second connecting members 1250 and 1260, which causes rotation of the first and second connecting members 1250 and 1260, altering their orientation about axes 1232 and 1272.

In various embodiments, elements of actuator assembly 1290 may incorporate dampening links, as illustrated by elements 1281-1284 in FIG. 12. Additionally, the main connecting member 1240 can include dampening links, such as links 1243 and 1244. These dampening links may employ any suitable mechanical or pneumatic mechanisms designed to dampen motion, reduce vibrations, and mitigate instabilities. Examples of such mechanisms include springs, pneumatic cylinders, and other similar components.

FIG. 13 shows an example method 1300, for actuating a rotor assembly, such as rotor assembly 1100 as shown in FIGS. 11A and 11B. At operation 1310, method 1300 includes activating a first motor to rotate a first set of rotor blades attached to the first rotor. The first rotor and motor assembly can be coupled to an outer end of a first connecting member. At operation 1315, method 1300 includes activating a second motor to rotate a second set of rotor blades attached to the second rotor. This second rotor and motor assembly is similarly coupled to the outer end of a second connecting member.

At operation 1320, method 1300 includes activating an actuator assembly to apply torque to both the first and second connecting members. This torque causes rotational movement of the connecting members about hinges coupling them to a main connecting member. Specifically, the first connecting member rotates about a first rotational axis defined by a first hinge. This hinge is positioned at one end of a main connecting member and connects to the coupling end of the first connecting member. Concurrently, the second connecting member rotates about a second rotational axis defined by a second hinge. This second hinge is located at the opposite end of the main connecting member and connects to the coupling end of the second connecting member.

In the foregoing specification, embodiments of the present disclosure have been described with reference to numerous specific details that may vary from implementation to implementation. The specification and drawings are, accordingly, to be regarded in an illustrative rather than a restrictive sense. The sole and exclusive indicator of the scope of the present disclosure, and what is intended by the applicants to be the scope of the present disclosure, is the literal and equivalent scope of the set of claims that issue from this application, in the specific form in which such claims issue, including any subsequent correction.

The scope of this disclosure encompasses all changes, substitutions, variations, alterations, and modifications to the illustrative embodiments described or illustrated herein that a person having ordinary skill in the art would comprehend. The scope of this disclosure is not limited to the embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

For the purposes of explanation, numerous specific details are set forth to provide a thorough understanding of the present disclosure. However, the embodiments of the present disclosure may be practiced without these specific details. In other instances, well-known structures and devices are shown in schematic form to avoid unnecessarily obscuring the description of the present disclosure.

The text in conjunction with the accompanying drawings aims to articulate the designs and methods at a level of detail consistent with the communication standards among skilled individuals in the relevant arts. This level of detail mirrors the customary communication among those with expertise in the field, effectively expressing the structure and function of the various designs outlined in this disclosure.

Various embodiments may be described in this disclosure to illustrate various aspects. Other embodiments may be utilized and structural, logical, software, and other changes may be made without departing from the scope of the embodiments that are specifically described. Various modifications and alterations are possible and expected. Some features may be described with reference to one or more embodiments or drawing figures, but such features are not limited to usage in the one or more embodiments or figures with reference to which they are described. Thus, the present disclosure is neither a literal description of all embodiments nor a listing of features that must be present in all embodiments.

Headings of sections and the title are provided for convenience but are not intended as limiting the disclosure in any way or as a basis for interpreting the claims.

A description of an embodiment with several components present does not necessarily imply that all such components are required. Optional components may be described to illustrate a variety of possible embodiments and to illustrate one or more aspects of the present disclosure more fully. Similarly, although process steps, method steps, algorithms, or the like may be described in sequential order, such processes, methods, and algorithms may generally be configured to work in different orders, unless specifically stated to the contrary. Any sequence or order of steps described in this disclosure is not a required sequence or order. The steps of the described processes may be performed in any order practical. Further, some steps may be performed simultaneously. The illustration of a process in a drawing does not exclude variations and modifications, does not imply that the process or any of its steps are necessary, and does not imply that the illustrated process is preferred. The steps may be described once per embodiment but need not occur only once. Some steps may be omitted in some embodiments or some occurrences, or some steps may be executed more than once in each embodiment or occurrence. When a single device or article is described, more than one device or article may be used in place of a single device or article. Where more than one device or article is described, a single device or article may be used in place of more than one device or article.

The functionality or features of a device may be alternatively embodied by one or more other devices that are not explicitly described as having such functionality or features. Thus, other embodiments need not include the device itself. Techniques and mechanisms described or referenced herein sometimes are described in singular form for clarity. However, it should be noted that embodiments include multiple iterations of a technique or multiple manifestations of a mechanism unless noted otherwise.

In various embodiments of the disclosure, terms such as "approximate," "about," "similar," "equal," "equivalent" or "the same as" are used to indicate a degree of flexibility or tolerance in numerical values, measurements, and characteristics disclosed. The scope of the disclosure should not be limited to strict numerical precision, and these terms are employed to allow for variations within acceptable limits.

The terms "approximate," "about," and "similar" are used interchangeably to convey that a given value, parameter, or characteristic may deviate within a reasonable range from the stated value. This range may encompass slight variations that do not materially affect the functionality or performance of the systems and methods described in this disclosure. For example, the terms "approximate," "about," and "similar" may refer to a variation of ten percent from a specific value.

The terms "equal," "equivalent," or "the same as" are used to indicate that values, parameters, or characteristics described as such are substantially identical or sufficiently close in magnitude, without necessarily requiring absolute precision. For example, such terms may refer to a deviation of a few percent from a specific value such as one or two percent.

Further, the term "similar" may be employed to denote a likeness or resemblance between two or more elements, aspects, or features, allowing for variations that do not compromise the fundamental nature or purpose of the disclosure.

In various embodiments of the disclosure, the term "set" is employed to denote a grouping or collection of objects, elements, components, or entities. The flexibility in the interpretation of the term "set" allows for adaptability and practical application in situations where a singular object satisfies the intended functionality or purpose of the disclosure. Thus, the disclosure is not limited to instances where a "set" must consist of multiple objects but rather contemplates scenarios where a "set" may include one object.

What is claimed is:

1. An assembly for controlling an orientation of a counterrotating rotor, the assembly comprising:

a main connecting member having a first end and a second end opposite the first end;

a first connecting member having a first coupling end and a first outer end, wherein the first coupling end is rotatably coupled to the first end of the main connecting member via a first hinge, the first hinge defining a first rotational axis;

a second connecting member having a second coupling end and a second outer end, wherein the second coupling end is rotatably coupled to the second end of the main connecting member via a second hinge, the second hinge defining a second rotational axis being parallel to the first rotational axis;

a first rotor having first rotor blades, the first rotor coupled to the first outer end;

a first motor mounted on the first outer end, configured to rotate the first rotor;

a second rotor having second rotor blades, the second rotor coupled to the second outer end;

a second motor mounted on the second outer end, configured to rotate the second rotor; and an actuator assembly configured to rotate about a third rotational axis to apply torque to the first and second connecting members, causing rotation of the first connecting member about the first rotational axis and the second connecting member about the second rotational axis.

2. The assembly of claim 1, wherein the first rotor blades have a first pitch and the second rotor blades have a second pitch that is lower than the first pitch.

3. The assembly of claim 1, wherein the actuator assembly is configured to tilt the first rotor by a first tilt angle and simultaneously tilt the second rotor by a second tilt angle that is equal and opposite to the first tilt angle.

4. The assembly of claim 3, wherein the first and the second tilt angles can range from a vertical zero orientation to a horizontal ninety degree orientation.

5. The assembly of claim 3, wherein the first and the second tilt angles can further have at least some negative values.

6. The assembly of claim 5, wherein the negative values for the first and the second tilt angles can range between −20 degrees and 0 degrees.

7. The assembly of claim 3, wherein, the second rotor blades are configured to fold when the second tilt angle is ninety degree in amplitude.

8. The assembly of claim 1, wherein the actuator assembly comprises:

an actuator member having a first actuator end and a second actuator end;

a first actuator element having a first element end and a second element end, the first actuator element being configured to:

rotatably connect its first element end to the first actuator end;

rotatably connect its second element end to the first connecting member at a first connecting point located between the first outer end and the first coupling end of the first connecting member;

a second actuator element having a third element end and a fourth element end, the second actuator element being configured to:

rotatably connect its third element end to the second actuator end:

rotatably connect its fourth element end to the second connecting member at a second connecting point located between the second outer end and the second coupling end of the second connecting member; and a servo motor configured to move the actuator member, thereby moving the first and second actuator elements, and causing a rotation of the first and second connecting members.

9. The assembly of claim 8, wherein the actuator member comprises a dampening link.

10. The assembly of claim 8, wherein at least one of the first actuator element, the second actuator element, or a combination thereof includes a dampening link.

11. An aircraft vehicle comprising:

an elongated spine element having a first end and a second end;

an elongated lift boom disposed at the first end of the spine element, the elongated lift boom extending perpendicular to the elongated spine element;

a plurality of assemblies of counterrotating rotors, each assembly from the plurality of assemblies coupled to the elongated lift boom, each assembly from the plurality of assemblies comprising:

a main connecting member having a first end and a second end opposite the first end;

a first connecting member having a first coupling end and a first outer end, wherein the first coupling end is rotatably coupled to the first end of the main connecting member via a first hinge, the first hinge defining a first rotational axis;

a second connecting member having a second coupling end and a second outer end, wherein the second coupling end is rotatably coupled to the second end of the main connecting member via a second hinge, the second hinge defining a second rotational axis being parallel to the first rotational axis;

a first rotor having first rotor blades, the first rotor coupled to the first outer end;

a first motor mounted on the first outer end, configured to rotate the first rotor;

a second rotor having second rotor blades, the second rotor coupled to the second outer end; and a second motor mounted on the second outer end, configured to rotate the second rotor; and an actuator assembly configured to rotate about a third rotational axis to apply torque to the first and second connecting members, causing rotation of the first connecting member about the first rotational axis and the second connecting member about the second rotational axis.

12. The aircraft vehicle of claim 11, wherein the plurality of assemblies comprises at least a left assembly coupled to a left end of the elongated lift boom and a right assembly coupled to a right end of the elongated lift boom.

13. The aircraft vehicle of claim 12, wherein the main connecting member corresponding to each the left assembly and the right assembly is solidly coupled to the respective left and right ends of the elongated lift boom.

14. The aircraft vehicle of claim 13, wherein the main connecting member corresponding to each the left assembly and the right assembly is solidly coupled to the respective left and right ends of the elongated lift boom at a midpoint of the main connecting member.

15. The aircraft vehicle of claim 13, wherein the first rotor blades of each of the left and right assemblies include front rotor blades having a first pitch, and the second rotor blades of each of the left and right assemblies include aft rotor blades having a second pitch, wherein the second pitch is lower than the first pitch.

16. The aircraft vehicle of claim 15, wherein the actuator assembly is configured to tilt the first rotor by a first tilt angle and simultaneously tilt the second rotor by a second tilt angle that is equal and opposite to the first tilt angle.

17. The aircraft vehicle of claim 11, wherein the second rotor blades are configured to fold when the axis of rotation of the second rotor aligns with a main axis extending along the main connecting member from the second rotor to the first rotor, and a movement of the aircraft exceeds a threshold value in a direction along the main axis.

18. A method for actuating a rotor assembly, the method comprising:

activating a first rotation of a first set of rotor blades of a first rotor via a first motor, the first rotor and the first motor being coupled to a first outer end of a first connecting member;

activating a second rotation of a second set of rotor blades of a second rotor via a second motor, the second rotor and the second motor being coupled to a second outer end of a second connecting member; and activating an actuator assembly to rotate about a third rotational axis to apply torque to the first connecting member and the second connecting member, thereby causing:

a rotation of the first connecting member about a first rotational axis defined by a first hinge, the first hinge being coupled to a main connecting member at a first end of the main connecting member, with the first connecting member connected to the first hinge at its first coupling end; and a rotation of the second connecting member about a second rotational axis defined by a second hinge, the second hinge being coupled to the main connecting member at a second end of the main connecting member, with the second connecting member connected to the second hinge at its second coupling end.

19. The method of claim 18, wherein the first connecting member rotates by a first tilt angle, and the second connecting member rotates by a second tilt angle that is equal in magnitude but opposite in direction to the first tilt angle.

20. The method of claim 19, wherein the first tilt angle is configured to range between about 0 to about 90 degrees.

* * * * *